United States Patent
Satheesh et al.

(10) Patent No.: US 11,540,002 B2
(45) Date of Patent: *Dec. 27, 2022

(54) AUTOMATIC SCREEN NAVIGATION FOR MEDIA DEVICE CONFIGURATION AND CONTROL

(71) Applicant: Caavo Inc, Milpitas, CA (US)

(72) Inventors: Sharath Hariharpur Satheesh, Bangalore (IN); Bitto Niclavose, Kottayam (IN); Vinod K. Gopinath, Bangalore (IN); Neha Mittal, Bangalore (IN); Siddharth Kumar, Bangalore (IN); Ashish D. Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/167,817

(22) Filed: Feb. 4, 2021

(65) Prior Publication Data

US 2021/0227282 A1    Jul. 22, 2021

Related U.S. Application Data

(63) Continuation of application No. 15/819,896, filed on Nov. 21, 2017, now Pat. No. 10,958,963.
(Continued)

(51) Int. Cl.
*H04N 5/445* (2011.01)
*H04N 21/422* (2011.01)
(Continued)

(52) U.S. Cl.
CPC ..... *H04N 21/42204* (2013.01); *G06F 3/0482* (2013.01); *G06V 10/44* (2022.01);
(Continued)

(58) Field of Classification Search
CPC .......... H04N 21/6543; H04N 21/8166; H04N 21/233; H04N 21/2387; H04N 21/4394;
(Continued)

(56) References Cited

U.S. PATENT DOCUMENTS

| 10,958,963 B2 | 3/2021 | Satheesh et al. |
| 2008/0098357 A1 | 4/2008 | Candelore |

(Continued)

FOREIGN PATENT DOCUMENTS

WO    2018/098167 A1    5/2018

OTHER PUBLICATIONS

International Search Report and Written Opinion received for PCT Application No. PCT/US2017/062821, dated Feb. 15, 2018, 11 pages.
(Continued)

*Primary Examiner* — Jivka A Rabovianski
(74) *Attorney, Agent, or Firm* — Fiala & Weaver P.L.L.C.

(57) ABSTRACT

Methods, systems, and apparatuses are described for automatically navigating a graphical user interface (GUI) of a media device. In embodiments, objects (e.g. selectable items) in device GUI menu screens may be located, identified, and selected by another device (e.g., a switch) using several types of image processing, image recognition, and automated screen navigation techniques. For instance, a device may receive an operation request, for example from a user, receive a video signal from the connected media device, extract a video frame, process the video frame using one or more algorithms, and automatically navigate the GUI of the device by transmitting one more navigation commands for application to the GUI. In this manner, multi-step, time-consuming manual GUI navigation to achieve a desired result may be reduced to an automated technique, allowing
(Continued)

users to save time and frustration in navigating a GUI using a remote control to find a particular resource.

20 Claims, 17 Drawing Sheets

Related U.S. Application Data

(60) Provisional application No. 62/425,364, filed on Nov. 22, 2016.

(51) Int. Cl.
| | | |
|---|---|---|
| *H04N 21/44* | (2011.01) | |
| *H04N 21/81* | (2011.01) | |
| *H04N 21/41* | (2011.01) | |
| *G06V 10/44* | (2022.01) | |
| *G06F 3/0482* | (2013.01) | |
| *H04N 21/4363* | (2011.01) | |
| *H04N 21/472* | (2011.01) | |

(52) U.S. Cl.
CPC . *H04N 21/41265* (2020.08); *H04N 21/42208* (2013.01); *H04N 21/43635* (2013.01); *H04N 21/44008* (2013.01); *H04N 21/472* (2013.01); *H04N 21/8186* (2013.01)

(58) Field of Classification Search
CPC ......... H04N 21/4147; H04N 21/44008; H04N 21/4882
USPC .................. 725/102, 120, 19, 37, 52, 88
See application file for complete search history.

(56) References Cited

U.S. PATENT DOCUMENTS

| | | | |
|---|---|---|---|
| 2009/0285443 | A1 | 11/2009 | Camp et al. |
| 2010/0070997 | A1 | 3/2010 | Friedman |
| 2012/0209878 | A1 | 8/2012 | Park et al. |
| 2012/0274863 | A1 | 11/2012 | Chardon et al. |
| 2013/0038793 | A1 | 2/2013 | Yoshida et al. |
| 2013/0268401 | A1 | 10/2013 | Choi et al. |
| 2014/0006951 | A1 | 1/2014 | Hunter |
| 2014/0059628 | A1 | 2/2014 | Kuo et al. |
| 2014/0208206 | A1 | 7/2014 | Scott et al. |
| 2014/0282668 | A1* | 9/2014 | Gava ................ H04N 21/44008 725/19 |
| 2014/0298361 | A1 | 10/2014 | Cussonneau et al. |
| 2014/0337879 | A1 | 11/2014 | Arling et al. |
| 2015/0026718 | A1* | 1/2015 | Seyller ............... H04N 21/4725 725/34 |
| 2015/0070247 | A1 | 3/2015 | Kasahara |
| 2015/0256873 | A1 | 9/2015 | Klein et al. |
| 2015/0264444 | A1 | 9/2015 | Wen et al. |
| 2016/0142647 | A1 | 5/2016 | Gopinath et al. |
| 2016/0150537 | A1 | 5/2016 | Jung et al. |
| 2016/0182924 | A1 | 6/2016 | Todd |
| 2016/0191992 | A1 | 6/2016 | Kwon |
| 2017/0006351 | A1 | 1/2017 | Haberman |
| 2017/0012926 | A1 | 1/2017 | Lennan et al. |
| 2018/0146233 | A1 | 5/2018 | Satheesh et al. |
| 2019/0058914 | A1 | 2/2019 | Satheesh et al. |
| 2019/0058915 | A1 | 2/2019 | Satheesh et al. |

OTHER PUBLICATIONS

International Preliminary Report on Patentability and Written Opinion received for PCT Application No. PCT/US2017/062821, dated Jun. 6, 2019, 7 pages.

Summons to Attend Oral Proceedings received for European Patent Application No. 17817424.9, mailed on Aug. 5, 2021, 9 pages.

* cited by examiner

AUTOMATIC SCREEN NAVIGATION FOR MEDIA DEVICE CONFIGURATION AND CONTROL

CROSS-REFERENCE TO RELATED APPLICATIONS

This application is a continuation of U.S. application Ser. No. 15/819,896 filed on Nov. 21, 2017, which claims the benefit of Provisional U.S. Patent Application No. 62/425,364, filed on Nov. 22, 2016, the entireties of which are incorporated by reference herein.

BACKGROUND

Background Art

An entertainment system may comprise several audio/video (A/V) devices connected to a television (TV) or high definition TV (HDTV). These devices may include, for example, a cable/satellite TV set top box (STB), an audio system, a Blu-ray® or DVD (digital versatile disc) player, a digital media adapter, a game console, a multimedia streaming device, etc. Each of these types of devices may have its own interface that a user must manually navigate to access desired content. For instance, a device may have several menus or nested graphical user interface (GUI) screens that may make it difficult and time consuming to locate content. As a result, not only must a user learn how to operate a remote control used to browse each of the devices, the user must also learn how to properly and efficiently navigate through each device's interface to locate content. As the number of connected devices has been steadily rising as the availability of multimedia content increases, the difficulty and time required for a user to navigate the various media device interfaces increases.

Additionally, navigating the interface of a media device using a traditional remote control can be cumbersome and further increase the navigation time. For instance, if a user is attempting to access a particular movie from a streaming media device, the user may need to power on the television using one remote control, switch the television's input with the remote control, power on the streaming media device with another, and manually navigate through various menus within the GUI of the streaming media device with a number of different keypresses to locate, select, and launch the desired content. While a universal remote control may be utilized to assist with navigating the interfaces of multiple devices, a user must still manually navigate through the media device's GUI, e.g., through multiple operations with the universal control, in order to perform a desired action.

Moreover, even where a user has taken the time to learn a device's interface, manufacturers are constantly updating devices' interfaces. In many instances, a user interface may be updated without the user's knowledge, e.g., when the device is not in use. Accordingly, a user may need to spend additional time after a software update to re-learn the interface.

BRIEF SUMMARY

Methods, systems, and apparatuses are described for automatically navigating a graphical user interface of a media device, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1A:
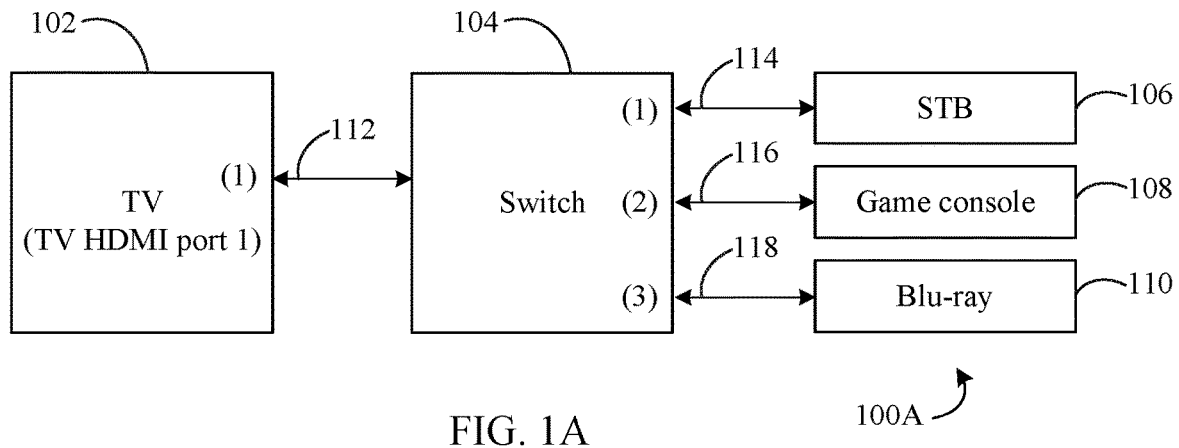
FIG. 1A is a block diagram of a typical High-Definition Multimedia Interface (HDMI) switch configuration.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are now described. Any section/subsection headings provided herein are not intended to be limiting. Embodiments are described throughout this document, and each embodiment may be eligible for inclusion within multiple different sections or subsections. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

Methods, systems, and apparatuses are described for automatically navigating a GUI of a media device. In embodiments, objects (e.g. selectable items) in device GUI menu screens may be automatically located, identified, and selected by another device (e.g., a switch), for example, using various image processing, image recognition, and automated screen navigation techniques. In another embodiment, a media device may be automatically configured by another device (e.g., a switch) in a number of ways using similar image processing, image recognition, and automated screen navigation techniques. In another embodiment, a device (e.g., a switch) may automatically navigate a media device to determine available resources using similar techniques. Multi-step, time-consuming GUI navigation to achieve a desired result may be reduced to an automated technique, allowing users to save time and frustration in navigating different GUIs trying to accomplish a task (e.g., to locate a desired resource).

In this manner, a device (e.g. switch) may become a universal application launch gateway for any activity on any of a variety of devices irrespective of the activities, devices or device GUI screen layouts. In embodiments, the automated navigation techniques described herein may be performed, for example, periodically and/or aperiodically (e.g. event driven such as by a request to launch multimedia content or a request to obtain a list of resources) for each device. In other embodiments, navigation and mapping may be performed, for example, when devices are not in use.

By way of example but without limitation, the embodiments herein may also be adapted to communication devices (e.g., cellular and smart phones, etc.), computers/computing devices (laptops, tablets, desktops, etc.), computing systems, other electronic devices such as gaming consoles, TVs, HDTVs, other home electronics and entertainment devices, HDMI repeaters, and/or the like, that may include HDMI input/output ports into which HDMI devices are connected. While embodiments may be described in the context of HDMI switches herein, it is contemplated that embodiments may be implemented according to the various types of systems and devices noted above. It is contemplated herein that in various embodiments and with respect to the illustrated figures of this disclosure, one or more components described and/or shown may not be included and that additional components may be included.

As noted above, a user's enjoyment and experience, e.g., for a home theater, may be lessened by complexities in, and time consumed for, device navigation that may require the manual use of several remote controls. The described techniques and embodiments include a navigation scheme in which a switch may receive a command to carry out on a GUI of a media device, and automatically navigate one more screens of the GUI to apply the command. According to embodiments, techniques are provided to alleviate or eliminate the problems above in different ways. Such techniques include, without limitation, a navigation component that may receive, extract, and process video information from a media device and a transmitter to transmit a command to carry out desired navigation and operation commands. In this manner, a user may no longer need to manually determine which remote control to utilize to control a given device, or manually press a number of keypresses on the remote control to navigate through several GUI screens to locate and select a particular item. Rather, a switching device may receive an operation request, for example from a user, and automatically navigate the GUI of the media device by transmitting one more navigation commands to the GUI. In some embodiments, the switching device may automatically determine which media device to navigate from a plurality of media devices.

A switch (e.g., an HDMI switch), according to disclosed embodiments, may be configured to automatically perform any type of action that may be performed manually by a user. For instance, an operation request (e.g., a request to launch an application) may be received by a switch. The switch may be configured to receive a video signal from the media device comprising a representation of the media device's GUI. One or more video frames may be extracted from the video signal. The switch is configured to process the one or more video frames to obtain GUI information (e.g., information regarding what selectable objects may be present on the GUI screen) based on any number of processing algorithms. Upon processing the video frames, the switch may determine whether the operation request may be carried out in the current GUI state. If not, the switch may automatically determine and transmit one or more navigation commands to navigate the GUI of the media device in an appropriate fashion. Upon causing the GUI to reach a state where an operation request may be carried out, an operation command may be transmitted to carry out the operation request (e.g., launch a desired application).

In accordance with other embodiments, similar techniques may be used to automatically configure a media device in a number of ways (e.g., download a resource, login to an application, modify user profile setting, configure a device setting). In other embodiments, similar techniques may be used to enable a switch to automatically interact with a media device to determine a list of available resources (e.g., determine a list of installed applications or a list of recorded multimedia content).

Thus, according to embodiments, the time and complexities noted above are minimized, making it easier for a user to navigate the media device without having the need to manually select and operate a remote control for the device, or browse through various GUI screens.

Accordingly, the techniques and embodiments described herein provide for improvements in automatic navigation of GUIs of consumer electronic devices, as described above. For instance, methods, systems, devices, and apparatuses are provided for automatic navigation of GUIs of one more media devices with minimal or reduced user involvement.

A method of automatically navigating a GUI of a media device in accordance with an example aspect is described herein. The method includes receiving at least one operation request. In response to receiving the at least one operation request, the method also includes receiving a video signal from the media device, extracting one or more video frames from the video signal, each of the one or more video frames comprising a representation of the GUI of the media device, and processing the one or more video frames to obtain GUI information therefrom. The method also includes automatically determining one or more navigation commands for the GUI of the media device based on the GUI information and the at least one operation request, and transmitting the one or more navigation commands for application to the GUI of the media device.

The foregoing method may also include converting the one or more video frames from a first image format associated with the received video signal to a second image format prior to processing the one or more video frames.

In one embodiment of the foregoing method, the one or more video frames undergoes, prior to processing the one or more video frames, at least one of resizing, thresholding or cropping.

In another embodiment of the foregoing method, the processing the one or more video frames to obtain GUI information therefrom includes at least one of: extracting a color channel, enhancing a contrast or brightness, performing at least one morphological operation, equalizing a histogram associated with the one or more video frames, extracting at least one of an edge, shape, or contour of an object in the one or more video frames, detecting one or more features in the one or more video frames, performing a normalization operation, or performing optical character recognition (OCR) on at least a portion of the one or more video frames.

The foregoing method may also include verifying, based on GUI information obtained from one or more additional video frames, whether the one or more navigation commands were successfully applied to the GUI of the media device.

The foregoing method may also include iteratively performing the receiving the video signal, extracting, processing, determining and transmitting steps until it is determined that an object selected on the GUI of the media device corresponds to the at least one operation request and transmitting an operation command to the GUI of the media device to execute the at least one operation request.

In a further embodiment of the foregoing method, a first device performs the receiving steps, and a second device performs at least one of the extracting, processing, determining or transmitting steps.

The foregoing method may also include determining a state of the media device.

In a still further embodiment of the foregoing method, the at least one operation request comprises a request to launch multimedia content on the media device.

The foregoing method may also include iteratively performing the receiving the video signal, extracting, processing, determining and transmitting steps until it is determined that an object selected on the GUI of the media device corresponds to an application that provides access to the multimedia content, and transmitting a first operation command to the GUI of the media device to execute the application. The foregoing method may also include iteratively performing the receiving the video signal, extracting, processing, determining and transmitting steps until it is determined that an object selected on the GUI of the media device corresponds to the multimedia content, and transmitting a second operation command to the GUI of the media device to launch the multimedia content.

The foregoing method may also include iteratively performing the receiving the video signal, extracting, processing, determining and transmitting steps until it is determined that an object selected on the GUI of the media device corresponds to a search field, and transmitting one or more commands comprising a text input into the search field. The foregoing method may also include obtaining one or more search results based on the inputted text, and transmitting an operation command to launch the multimedia content from the one or more search results.

The foregoing method may also include iteratively performing the receiving the video signal, extracting, processing, determining and transmitting steps until it is determined that an object selected on the GUI of the media device corresponds to the multimedia content, and transmitting an operation command to the GUI of the media device to launch the multimedia content.

In one embodiment of the foregoing method, the transmitting the one or more navigation commands comprises transmitting at least one of a radio-frequency (RF) signal, an infrared (IR) signal, an Internet Protocol (IP) signal, or a High-Definition Multimedia Interface Consumer Electronics Control (HDMI-CEC) signal to the media device.

A system for automatically navigating a GUI of a media device in accordance with an example aspect is also described herein. The system includes a first device configured to receive at least one operation request. The system also includes one or more processing components. The one or more processing components are configured to, in response to receiving the at least one operation request, receive a video signal from the media device, extract one or more video frames from the video signal, each of the one or more video frames comprising a representation of the GUI of the media device, process the one or more video frames to obtain GUI information therefrom, automatically determine one or more navigation commands for the GUI of the media device based on the GUI information and the at least one operation request, and transmit the one or more navigation commands, via a transmitter, for application to the GUI of the media device.

The foregoing system may also include a video frame preparer configured to convert the one or more video frames from a first image format associated with the received video signal to a second image format prior to processing the one or more video frames.

The foregoing system may also include a video frame preparer configured to modify the one or more video frames, prior to processing the one or more video frames, by at least one of resizing, thresholding, or cropping.

In one embodiment of the foregoing system, the one or more processing components are configured to process the one or more video frames to obtain GUI information therefrom by performing at least one of extracting a color channel, enhancing a contrast or brightness, performing at least one morphological operation, equalizing a histogram associated with the one or more video frames, extracting at least one of an edge, shape, or contour of an object in the one or more video frames, detecting one or more features in the one or more video frames, performing a normalization operation, or performing optical character recognition (OCR) on at least a portion of the one or more video frames.

In another embodiment of the foregoing system, the one or more processing components are further configured to verify, based on GUI information obtained from one or more additional video frames, whether the one or more navigation commands were successfully applied to the GUI of the media device.

In another embodiment of the foregoing system, the one or more processing components are further configured to iteratively receive the video signal, extract the one or more video frames, process the one or more video frames, automatically determine the one or more navigation commands, and transmit the one or more navigation commands until a determination is made that an object selected on the GUI of the media device corresponds to the at least one operation request. The one or more processing components are also configured to cause the transmitter to transmit an operation command to the GUI of the media device to execute the at least one operation request.

In still another embodiment of the foregoing system, the first device includes a processing component that is configured to receive the video signal, and one or more processing components that are configured to extract the one or more video frames, process the one or more video frames, automatically determine the one or more navigation commands, or transmit the one or more navigation commands comprise part of a second device.

In yet another embodiment of the foregoing system, the one or more processing components are further configured to determine a state of the media device.

In a further embodiment of the foregoing system, the at least one operation request comprises a request to launch multimedia content on the media device.

In another embodiment of the foregoing system, the one or more processing components are further configured to iteratively receive the video signal, extract the one or more video frames, process the one or more video frames, automatically determine the one or more navigation commands, and transmit the one or more navigation commands until a determination is made that an object selected on the GUI of the media device corresponds to an application that provides access to the multimedia content. In further accordance with such an embodiment, the one or more processing components are further configured to transmit a first operation command to the GUI of the media device to execute the application. In still another embodiment of the foregoing system, the one or more processing components are further configured to iteratively receive the video signal, extract the one or more video frames, process the one or more video frames, automatically determine the one or more navigation commands, and transmit the one or more navigation commands until a determination is made that an object selected on the GUI of the media device corresponds to the multimedia content. In further accordance with such an embodiment, the one or more processing components are further configured to transmit a second operation command to the GUI of the media device to launch the multimedia content.

In yet another embodiment of the foregoing system, the one or more processing components are further configured to iteratively receive the video signal, extract the one or more video frames, process the one or more video frames, automatically determine the one or more navigation commands, and transmit the one or more navigation commands until a determination is made that an object selected on the GUI of the media device corresponds to a search field. In further accordance with such an embodiment, the one or more processing components are further configured to transmit one or more commands comprising a text input into the search field, obtain one or more search results based on the inputted text, and transmit an operation command to launch the multimedia content from the one or more search results.

In still another embodiment of the foregoing system, the one or more processing components are further configured to iteratively receive the video signal, extract the one or more video frames, process the one or more video frames, automatically determine the one or more navigation commands, and transmit the one or more navigation commands until a determination is made that an object selected on the GUI of the media device corresponds to the multimedia content. In further accordance with such an embodiment, the one or more processing components are further configured to transmit an operation command to the GUI of the media device to launch the multimedia content.

In a further embodiment of the foregoing system, the one or more processing components are configured to transmit the one or more navigation commands by causing a transmitter to transmit at least one of an RF signal, an IR signal, an IP signal, or an HDMI-CEC signal to the media device.

A method of automatically controlling a media device in accordance with an example aspect is also described herein. The method includes obtaining, in a first device, configuration information to configure the media device. The method also includes automatically interacting with a GUI provided by the media device to apply the configuration information to the media device. In accordance with the method, the automatically interacting comprises iteratively performing the steps of receiving a video signal from the media device, extracting one or more video frames from the video signal, each of the one or more video frames comprising a representation of the GUI of the media device, processing the one or more video frames to obtain GUI information therefrom, and transmitting one or more navigation commands based on the GUI information and the configuration information.

In one embodiment of the foregoing method, applying the configuration information to the media device comprises downloading an application on the media device.

In another embodiment of the foregoing method, applying the configuration information to the media device comprises inputting user login information for an application.

In still another embodiment of the foregoing method, applying the configuration information to the media device comprises modifying a user profile setting.

In yet another embodiment of the foregoing method, applying the configuration information to the media device comprises at least one of modifying a video setting, an audio setting, a power setting, or an HDMI-CEC setting of the media device.

A system for automatically controlling a media device in accordance with an example aspect is also described herein. The system includes a first device and one or more processing components. The first device is configured to obtain configuration information to configure the media device. The one or more processing components are configured to automatically interact with a GUI provided by the media device to apply the configuration information to the media device. In the system, the automatic interaction includes iteratively receiving a video signal from the media device, extracting one or more video frames from the video signal, each of the one or more video frames comprising a representation of the GUI of the media device, processing the one or more video frames to obtain GUI information therefrom, and transmitting one or more navigation commands based on the GUI information and the configuration information.

In one embodiment of the foregoing system, the configuration information includes an instruction to download an application on the media device.

In another embodiment of the foregoing system, the configuration information includes user login information for an application.

In yet another embodiment of the foregoing system, the configuration information includes a modification of a user profile setting.

In still another embodiment of the foregoing system, the configuration information includes at least one of a modification of a video setting, an audio setting, a power setting, or an HDMI-CEC setting of the media device.

A method of automatically identifying one or more resources available via a media device in accordance with an example aspect is also described herein. The method includes automatically navigating a GUI of the media device. In the method, the automatically navigating comprises receiving a video signal from the media device, extracting one or more video frames from the video signal, each of the one or more video frames comprising a representation of the GUI of the media device, and processing the one or more video frames to obtain GUI information therefrom. The method also includes determining at least one resource available on the media device based on the GUI information. The method also includes storing a list of the at least one resource in a first device.

The foregoing method may also include receiving an operation request to execute a resource from the list of the at least one resource, automatically navigating the GUI of the media device until it is determined that an object selected on the GUI of the media device corresponds to the operation request, and transmitting a command to the GUI of the media device to execute the resource.

The foregoing method may also include displaying the list of the at least one resource on a sink device coupled to the first device.

In one embodiment of the foregoing method, the first device is a switching device, and the switching device automatically selects the media device from a plurality of media devices to execute a resource from the list of the at least one resource.

In another embodiment of the foregoing method, the at least one resource includes an executable application stored on the media device.

In yet another embodiment of the foregoing method, the at least one resource comprises multimedia content.

In still another embodiment of the foregoing method, the one or more video frames comprises at least a portion of a program guide of a set-top box, and the list of the at least one resource comprises a subscribed channel list of the set-top box.

In a further embodiment of the foregoing method, the automatically navigating is performed while the first device is not transmitting the video signal to a sink device.

In a still further embodiment of the foregoing method, the media device is a digital video recorder (DVR), and the at least one resource comprises multimedia content recorded on the DVR.

A system for automatically identifying one or more resources available via a media device according to an example aspect is also described herein. The system includes one or more processing components, a resource determiner, and a memory. In the system, the one or more processing components are configured to automatically navigate a GUI of the media device. The automatic navigation of the GUI includes receiving a video signal from the media device, extracting one or more video frames from the video signal, each of the one or more video frames comprising a representation of the GUI of the media device, and processing the one or more video frames to obtain GUI information therefrom. The resource determiner is configured to determine at least one resource available on the media device based on the GUI information. The memory is configured to store a list of the at least one resource in a first device.

The foregoing system may also include a first device configured to receive an operation request to execute a resource from the list of the at least one resource. In accordance with such an embodiment, the one or more processing components configured to automatically navigate the GUI of the media device may be further configured to automatically navigate the GUI of the media device until it is determined that an object selected on the GUI of the media device corresponds to the operation request, and transmit a command to the GUI of the media device, via a transmitter, to execute the resource.

The foregoing system may also include a display coupled to the first device for displaying the list of the at least one resource.

In one embodiment of the foregoing system, the first device is a switching device, and the switching device is configured to automatically select the media device from a plurality of media devices to execute a resource from the list of the at least one resource.

In another embodiment of the foregoing system, the at least one resource includes an executable application stored on the media device.

In yet another embodiment of the foregoing system, the at least one resource comprises multimedia content.

In still another embodiment of the foregoing system, the one or more video frames comprises at least a portion of a program guide of a set-top box, and the list of the at least one resource comprises a subscribed channel list of the set-top box.

In a further embodiment of the foregoing system, the one or more processing components configured to automatically navigate a GUI of the media device are further configured to automatically navigate the GUI while the first device does not transmit the video signal to a sink device.

In a still further embodiment of the foregoing system, the media device is a DVR, and the at least one resource comprises multimedia content recorded on the DVR.

Various example embodiments are described in the following subsections. In particular, example switch embodiments are described, followed by a description of integration embodiments. Subsequently, operational embodiments are provided, and then further example embodiments and advantages are described. Finally, some concluding remarks are provided. It is noted that the division of the following description generally into subsections is provided for ease of illustration, and it is to be understood that any type of embodiment may be described in any subsection.

III. Example Switch Embodiments

Systems and devices may be configured in various ways according to the embodiments and techniques described herein. In embodiments, a switch (or repeater or other device with connectors/ports, such as HDMI ports) may be connected to one or more media devices. The switch or other device may be configured, according to embodiments, to automatically identify and map connected devices to universal connectors/ports of the switch.

In order to manage multiple devices, a repeater/switch is used between the sink and the many sources that allows a user to switch amongst the sources without having to physically swap out cables every time. For instance, a typical HDMI switch configuration 100A is shown in FIG. 1A. A sink device such as TV 102 is connected to an HDMI switch 104 over an HDMI connection 112. One or more source devices are also connected to HDMI switch 104. For example, a STB 106 is connected via an HDMI connection 114, a game console 108 is connected via an HDMI connection 116, and a Blu-ray® player 110 is connected via an HDMI connection 118.

Many televisions have also started incorporating switch functionality. Multiple media devices are connected directly to the television that then acts as a switch. However, many televisions have a limited number of inputs for source devices and an additional external switch may be required to manage the source devices. Moreover, televisions lack the ability to connect to an external, surround speaker system which makes an HDMI repeater (e.g., an audio/video repeater (AVR)) another candidate to be placed in between media devices and a sink.

Figure 1B:
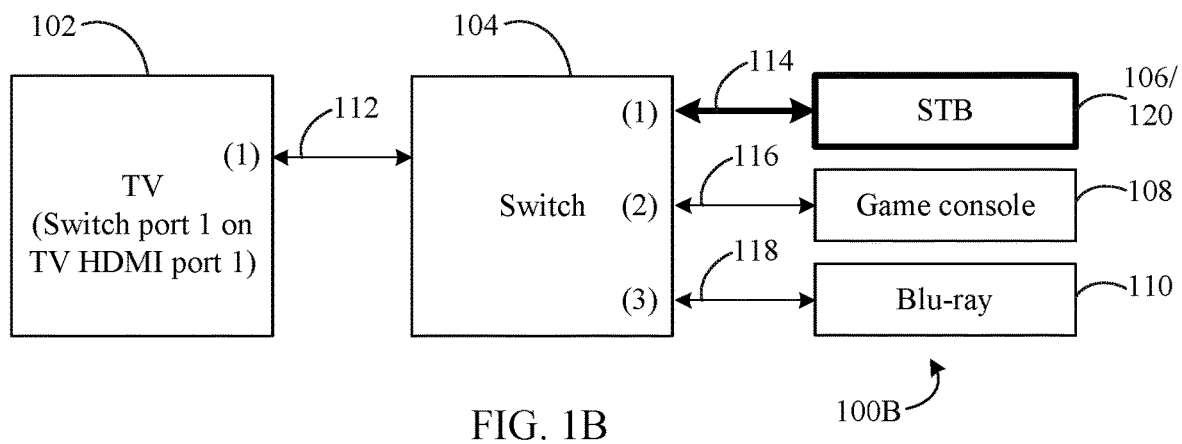
FIGS. 1B and 1C are block diagrams showing a port change for an HDMI switch in the typical HDMI switch configuration of FIG. 1A.
Figure 1C:
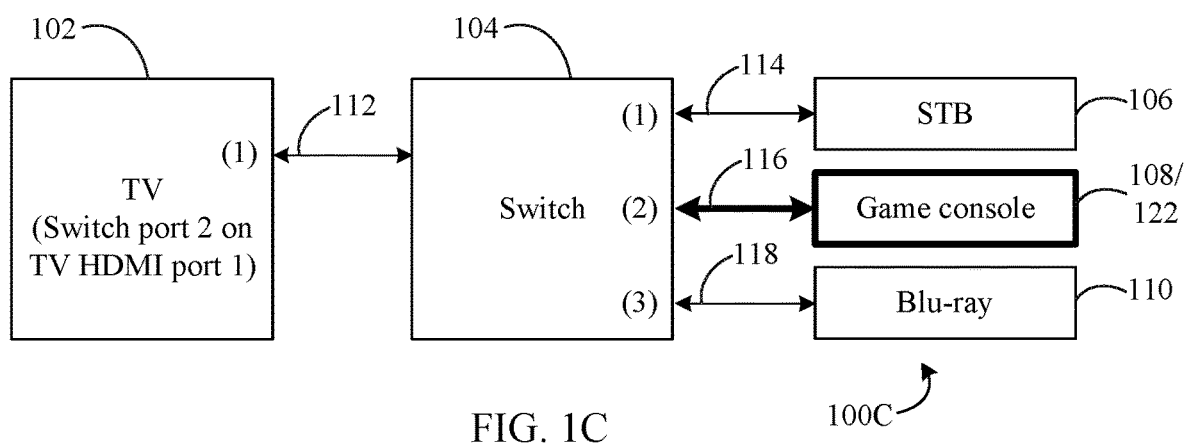

To add to the confusion, a typical HDMI switch has ports that have a fixed configuration as inputs or outputs. It is therefore required that media devices are connected to inputs of the HDMI switch and the HDMI sink(s) to the output(s) of the HDMI switch. Once plugged in, it becomes difficult to remember which device was connected to which port. For example, FIG. 1B shows a switch configuration 100B that is a variation of switch configuration 100A. In FIG. 1B, STB 106 has become the active source device, which is the device selected by HDMI switch 104 to supply media content to TV 102. Accordingly, HDMI switch 104 switches to input port 1 for STB 106, thereby making STB 106 an active device 120 that supplies media content over HDMI connection 114 in switch configuration 100B. Similarly, FIG. 1C shows a switch configuration 100C that is a variation of switch configurations 100A and 100B with a change for HDMI switch 104 from input port 1 to input port 2 for game console 108. That is, game console 108 has become an active device 122 enabled to supply media content to TV 102 over HDMI connection 116 in switch configuration 100B. However, for a user to change to port 1 of HDMI switch 104, or to port 2 of HDMI switch 104, the user must remember which device is connected to which port.

Additionally, given that switching ports takes time due to the inherent latencies associated with syncing the newly selected source input (e.g., due to potentially different A/V characteristics, content protection checks, etc.) to the sink, the user may shuffle a few times amongst the various ports before being able to fix on the right port. In addition, once the appropriate port is selected, the user must operate a remote control to manually navigate the user interface of the selected device, which may be cumbersome and time-consuming.

Each of these issues decreases the overall enjoyment and satisfaction associated with the end user experience.

Figure 2:
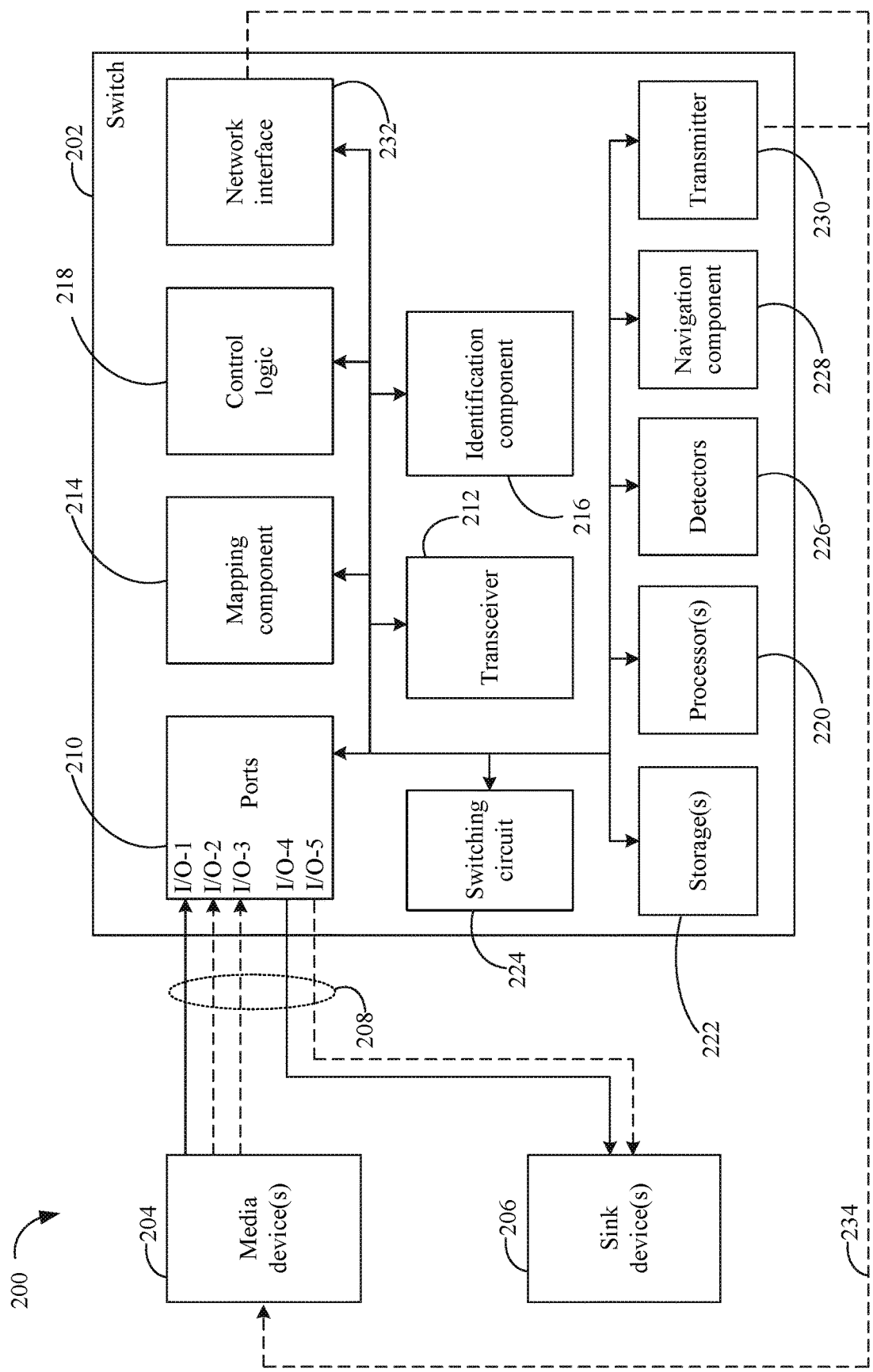
FIG. 2 is a block diagram of a smart switch configuration, according to an exemplary embodiment.

FIG. 2 is an example of a system 200 for a switch 202 (e.g., an HDMI smart switch). Switch 202 may include and/or encompass the embodiments described herein. That is, switch 202 of FIG. 2 is configured to perform methods and/or functions as described in embodiments using components and/or sub-components of the described embodiments. For instance, switch 202 may be configured to receive a video signal from a connected media device (e.g., one of media device(s) 204) representing the GUI of the media device, and automatically navigate or interact with the GUI based on GUI information extracted from the video signal, according to embodiments.

In embodiments, switch 202 includes one or more components such as ports 210, one or more storage(s) 222, one or more processor(s) 220, a transceiver 212, a mapping component 214, control logic 218, a switching circuit 224, detectors 226, an identification component 216, a navigation component 228, a transmitter 230, and a network interface 232. Switch 202 may be coupled to one or more media device(s) 204 and/or to one or more sink device(s) 206 via interfaces 208 (e.g., HDMI interfaces) as would be understood by persons of skill in the relevant art having the benefit of this disclosure. Interfaces 208 may comprise HDMI interfaces that may enable communications between an HDMI port of a media device and an HDMI port of switch 202. Although examples refer to devices with HDMI capabilities and to an HDMI switch, the subject matter is applicable to devices with other suitable interfaces (e.g. USB, composite, component, DVI, etc.) and to any device that may provide a video screen containing a GUI with at least one selectable object that may be navigated (e.g. an interactive display). For example, switch 202 may be configured to automatically navigate both HDMI and non-HDMI connected sources that may be capable of receiving navigation or operation commands via IP, IR, RF, and/or HDMI-CEC protocols.

Ports 210 may be one or more HDMI ports (i.e., HDMI connectors) as described herein. Ports 210 may be dynamically configured as input ports (e.g., corresponding to sources devices) or output ports (e.g., corresponding to sink devices) according to the described embodiments. Ports of ports 210 may be referred to as universal HDMI ports as these ports may be dynamically configured as inputs or outputs on connection of an HDMI device. In other words, in system 200 there is no need to pre-define the function of any port of ports 210. Thus, the same physical port for ports 210 can act as an input or an output depending on which type of HDMI device is connected, and this considerably enhances the convenience of use for an HDMI switch. The port interface scheme is such that a repeater device or a switch (e.g., switch 202) is able to detect the type of device connected to the HDMI port and automatically configure the internal circuits to support either a sink or a source.

Storage(s) 222 may be one or more of any storage device described herein, such as, but not limited to, those described below with respect to FIG. 23.

Processor(s) 220 may be one or more of any processing device or processor described herein, such as, but not limited to, those described below with respect to FIG. 23, and may be configured as described elsewhere herein.

Transceiver 212 is configured to receive and transmit wired and/or wireless information according to any protocol and/or embodiment described herein, such as HDMI in HDMI switch embodiments. For instance, transceiver 212 is configured to receive and to transmit audio/video signals according to a suitable interface protocol from media devices and sinks respectively.

Detectors 226 are configured to detect indicia of operational modes to determine a type of an HDMI enabled electronic device connected to ports 210 (i.e., whether the device is a source or a sink). In embodiments, detectors 226 may be configured to make such a detection/determination based on signals received from pins of ports 210.

Detectors 226 also include a sensor or the like configured to receive a command from a user to control switch 202 or any of the media device(s) 204 or sink device(s) 206. For instance, detectors 226 may include one more input devices, such as a remote control, that may be operable to control one or more functions of switch 202 or transmit operation commands (or other commands) to switch 202. In embodiments, detectors 226 may include an IR sensor and/or an RF receiver configured to receive signals via any suitable protocol, such as via Wi-Fi, Bluetooth®, ZigBee® RF4CE, etc., in embodiments. In other embodiments, detectors 226, or a remote control (not shown herein) configured to communicate with switch 202 via detectors 226, may include a microphone configured to capture a voice command from a user. Using techniques known to those skilled in the art, the voice command may be converted automatically to text, which may be used by one or more components of switch 202 as discussed later.

Identification component 216 may be implemented as hardware (e.g., electrical circuits), software (e.g., as executed by a processor or processing device), and/or firmware. Identification component 216 is configured to identify electronic devices (e.g., media device(s) 204 and sink device(s) 206) coupled or connected to HDMI ports 210. That is, for each of media device(s) 204 and sink device(s) 206, identification component 216 is configured to determine one or more identifiers of the connected electronic devices, such as, but not limited to a type of the electronic device (e.g., a DVD player, a Blu-ray player, a video game console, a streaming media device, a TV, an HDTV, a projector, etc.), a brand name of the electronic device, a manufacturer of the electronic device, a model number of the electronic device, etc. These identifiers may be determined according to various techniques, such as, but not limited to: techniques based on HDMI consumer electronics control (CEC), source product description (SPD), extended display identification data (EDID), video data, audio data, IP network information, remote control operation by user, voice input from user, and explicit device selection by user. Identification component 216 provides the one or more identifiers to mapping component 214.

Mapping component 214 may be implemented as hardware (e.g., electrical circuits), software (e.g., as executed by a processor or processing device), and/or firmware. Mapping component 214 is configured to determine a device-to-port mapping based on one or more identifiers determined by identification component 216. Mapping component 214 may generate a data structure (e.g., a table or the like) that associates the identifiers for any given identified electronic device with the HDMI port of ports 210 to which that media device is coupled. In this way, the device-to-port mapping may indicate that a first electronic device (e.g., a Blu-ray® player) of media device 204 is connected to a first port (e.g., I/O-1) of ports 210, and that a second electronic device (e.g., a TV) of sink device(s) 206 is connected to a second port (e.g., I/O-5) of ports 210. In embodiments, mapping component 214 may further be configured to generate another data structure (e.g., a table or the like) that associates a particular resource (e.g., executable application or multimedia content) with a particular media device connected to switch 202. Accordingly, a resource-to-device and/or a resource-to-port mapping may indicate that a first resource is available on a first port (e.g., a streaming media player coupled to I/O-2) of ports 210 and a second resource is available on a second port (e.g., a DVR coupled to I/O-3) of ports 210.

Based at least in part on one or more of the operating mode, the identifiers, and commands received from one of detectors 226, identification component 216, and mapping component 214, control logic 218 is configured to provide a control signal to switching circuit 224 and/or to transceiver 212, causing switching circuit 224 to connect the identified electronic devices on ports of ports 210 to corresponding receiver portions or transmitter portions of transceiver 212 and/or causing transceiver 212 to output desired content received from one of media device(s) 204 on a specified output port of ports 210.

Switching circuit 224 is configured to provide switched connections between ports 210 and transceiver 212. That is, switching circuit 224 may provide a connection between any port of ports 210 and any receiver component or transmitter component of transceiver 212. Switching circuit 224 may comprise one or more switch circuit portions (e.g., comprising one or more switches/switching elements) and may be combined or used in conjunction with other portions of system 200.

Navigation component 228 is configured to automatically navigate a GUI of any of media device(s) 204. In accordance with embodiments, navigation component 228 receives a video signal from any of media device(s) 204 containing a representation of the GUI, extracts one or more video frames from the video signal, and processes the one or more video frames to obtain GUI information. Based on the GUI information, navigation component 228 may determine one or more commands to automatically navigate the GUI of the media device.

Navigation component 228 may be further configured to automatically perform any type of action that may be performed manually by a user, as will be discussed in greater detail below. For instance, in response to a received operation request, navigation component 228 may be configured to automatically locate an application to execute on a media device, navigate to the application, and issue a command to execute the application. Similarly, navigation component may automatically navigate a media device to execute multimedia content in response to a received operation request. In another embodiment, navigation component may automatically navigate to a search function within the GUI of the media device, input a search phrase, and automatically select one of the search results.

In accordance with other embodiments, discussed in greater detail below, navigation component 228 may automatically configure a media device. For instance, using techniques described herein, navigation component 228 may cause a resource to be downloaded to a media device. Navigation component 228 may also automatically login to an application executed on a media device, or modify a user profile setting. In other embodiments, navigation component 228 may perform any other configuration function of any of media devices 204, such as modifying an audio setting, a video setting, a power setting, or an HDMI-CEC setting of the media device.

In other embodiments, as discussed further below, navigation component 228 may be configured to interact with one of media devices 204 to automatically determine a list of available resources. For instance, navigation component 228 may automatically browse through a GUI of any of media devices 204 to obtain a list of applications or multimedia content that may be launched. In other embodiments, navigation component 228 may automatically browse through a program guide of a set-top box to determine a list of channels for which a user has subscribed. In another example, navigation component 228 may browse the stored recordings of a DVR to obtain a list of recorded shows.

Network interface 232 is configured to enable switch 202 to communicate with one or more other devices (not shown) via a network, such as a local area network (LAN), wide area network (WAN), and/or other networks, such as the internet. Network interface 232 may include any suitable type of interface, such as a wired and/or wireless interfaces. In embodiments, network interface 232 may enable switch 202 with two-way communication with one or more remote (e.g., cloud-based) systems. For instance, a remote system, such as a cloud-based server, may aid navigation component 228 in automatically navigating a GUI of one or more media devices by performing one or more steps of the techniques described herein. For example, in accordance with embodiments discussed herein, one or more other remote devices communicatively coupled via network interface 232 may contain one or more features of navigation component 228 to increase an automatic navigation speed. Given that the remote systems may be able to provide additional processing power beyond navigation component 228 of switch 202, the automatic navigation of a GUI as described herein may be completed even faster by leveraging this additional processing capability. In embodiments, a remote (e.g., cloud-based) server may also aid navigation component 228 in automatically navigating a GUI by providing processing parameters to navigation component 228, as described in more detail later.

Transmitter 230 is configured to transmit a signal 234 to any of media devices 204 or sinks 206. For instance, signal 234 may include a command directing the GUI of any of media devices 204 to cause the media device/s GUI to respond in a certain manner. For instance, the command may be a navigation command to move a cursor in a specified direction (e.g., up, down, left, or right) on the GUI screen. Transmitter 230 may also be configured to transmit any other signal 234 to media devices 204, including but not limited to, signals that may be used to execute a resource on media devices 204 (e.g., an "enter" or "select" command), select an object, input text (e.g., letters or entire text strings), configure media devices 204, and/or otherwise interact with a GUI of media devices 204. In embodiments, navigation component 228 may transmit, via transmitter 230, a single signal 234, or multiple successive signals in order to effectuate an automatic navigation or control of media devices 204.

In accordance with embodiments discussed herein, transmitter 230 may transmit signal 234 via any suitable type of RF communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or IP-based communication technologies such as any of the well-known IEEE 802.11 protocols, etc.), and/or the like. In another embodiment, transmitter 230 may transmit signal 234 via a wired connection (e.g., via a Universal Serial Bus (USB) cable, a coaxial cable, IP-based communication technologies, etc.) or transmitted via any other type of wireless connection (e.g., via IR communication) and/or the like.

As an extension of the above-described embodiments, a smart HDMI switch (e.g., switch 202) may also be complemented by a smart application (app) that runs on devices such as smartphones, tablets, computers, TVs, etc. In embodiments, the smart app is configured to be in communication with the smart HDMI switch and to communicate with similar wireless interfaces (e.g., Wi-Fi, IR, Bluetooth®, ZigBee® RF4CE, etc.) as the smart HDMI switch for communicating with other devices.

A. Example Automatic Navigation Embodiments

An entertainment system may have many devices with HDMI and/or other interfaces (e.g. USB). It may be a complex and/or time-consuming procedure to setup and/or to control/operate each device alone and in combination with other devices. Some device operations may involve lengthy procedures with multiple operations involving a GUI. For example, launching a particular application on a media device (e.g., Netflix® on AppleTV® or Roku® device) through the device's GUI navigable screens may require a series of operations using a remote control. The procedure may be cumbersome and time-consuming. Additionally, GUI screens may change over time, e.g., due to software updates.

As discussed above, audio and/or video (A/V) source devices and A/V sink devices may be connected to a switch (e.g. a "Smart HDMI Switch" or USB switch, which may be in a TV). The switch may make connections between devices (e.g. a media player and a TV) based on a user input (e.g., provided through one or more remote controls, a voice input, and/or physical or GUIs). A/V signals transmitted and/or received by devices may pass through the switch. The switch may provide one or more controls for the devices and/or A/V signals, for example, based on a user input.

Objects (e.g., selectable items) in a media device GUI may be located, identified, and selected automatically by another device (e.g. a switch or a TV), for example, using automatic screen navigation techniques described herein. In this manner, multi-step, time-consuming manual GUI navigation by a user to achieve a desired result may be accomplished automatically upon receiving an operation request, allowing users to save time and frustration in locating a particular remote control and learning how to navigate different GUIs in an attempt to find a particular resource. A device (e.g. switch or TV) may carry out the automatic screen navigation techniques described herein on any of a variety of devices irrespective of the activities, devices or device GUI screen layouts.

For instance, a device (e.g. an HDMI Blu-Ray Disc (BD) player) or a streaming media device (e.g., an AppleTV® device) may generate one or more GUI screens for display (e.g. on a TV) to a user/viewer. Each GUI screen may have one or more selectable (e.g., clickable) icons. Icons may, for example, identify a service provider or executable application (e.g., Netflix®, Amazon®, Hulu®, YouTube®, etc.), multimedia content (e.g., a movie or television show), or an information entry field (e.g., search or configurable settings). A user may use a device remote control to interact with a device's GUI menu, e.g., to make selections or entries on one or more GUI screens, which may lead to additional screens. There may be a multi-step selection procedure involving multiple screens to navigate or traverse a GUI menu to a desired destination or result. In accordance with techniques described herein, the entire multi-step selection procedure may be automated through navigation component 228 that receives a video signal containing the GUI, extracts one or more video frames, and processes the one or more video frames to obtain GUI information therefrom. Using the GUI information, navigation component 228 can automatically determine which commands to transmit to the media device to achieve the desired result.

By way of an illustrative, non-limiting example, media device 204 may be an AppleTV® device, which may provide to a user, via a GUI, a plurality of selectable resources. For instance, AppleTV® may have a home screen displayed in the device's GUI, which may contain various icons and/or logos representing selectable resources (e.g., Netflix®, iTunes® TV shows, YouTube®, etc.).

Navigation component 228 may receive a video signal comprising one or more GUI screens (e.g., a home screen), extract a video frame comprising the GUI screen, and process the video frame to obtain GUI information. GUI information may include, for instance, information representative of the available resources on a given video frame, the location of the available resources within the video frame, and/or the location of a currently selected resource, among other extracted information. Based on this information, navigation component 228 may transmit a navigation command to the AppleTV® device to cause the device to move from a currently selected resource to a different resource (e.g., a desired resource). Upon selecting a desired resource, navigation component 228 may transmit an operation command to automatically launch the resource on the AppleTV® device. However, as described in more detail below, the techniques are not limited to AppleTV® or any other particular media device. Rather, navigation component 228 is configured to extract video frames irrespective of the device or GUI, and process the video frame(s) to automatically determine an appropriate navigation command based on the information obtained therefrom. In this manner, the automatic navigation may be applied to any and every device, menu, icon, logo, text, etc.

It is noted, however, that a GUI of a connected media device need not be on a particular screen (e.g., a home screen) prior to commencing an automatic navigation. In embodiments, navigation component 228 may be configured to automatically cause the GUI to land on a predetermined screen (e.g., a home screen or any appropriate menu screen) to commence the automatic GUI navigation (e.g., by transmitting one or more appropriate navigation commands). It is further understood that a particular media device need not be selected by switch 202 or even be powered on prior to carrying out the automatic navigation techniques described. For instance, in response to receiving an operation request, switch 202 may automatically power on a device to receive a video signal. In another embodiment, if switch 202 is currently displaying content from a first connected media device and a user transmits an operation command to launch or search for resources using a second media device, switch 202, via switching circuit 224, may be configured to select the port from ports 210 corresponding to the second media device to receive audio/video signals therefrom.

Figure 3:
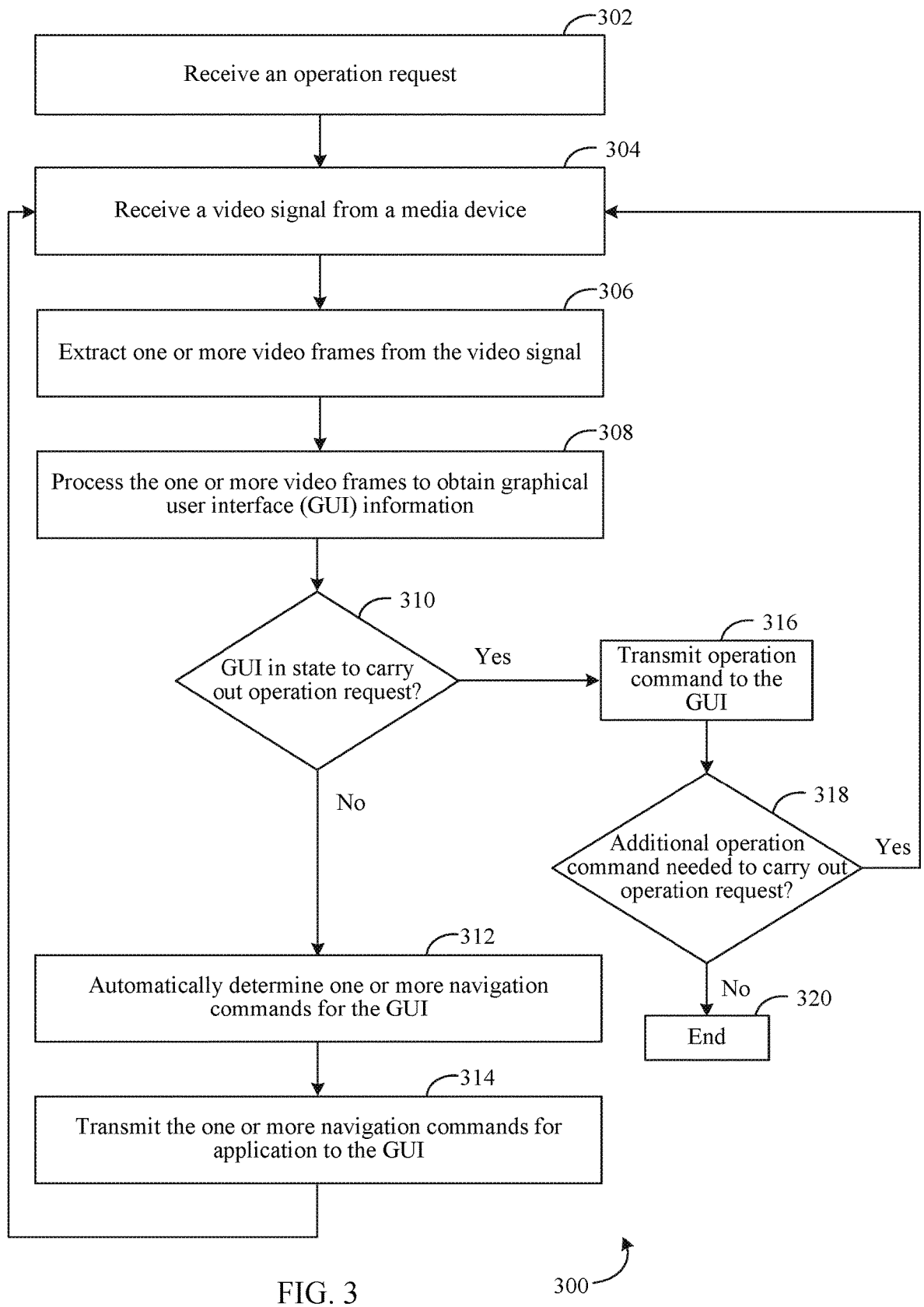
FIG. 3 is a flowchart of a method for automatically navigating a GUI of a media device to carry out an operation request, according to an exemplary embodiment.

In accordance with embodiments disclosed herein, automatic navigation of a device GUI may be performed in many ways. For instance, FIG. 3 depicts a flowchart 300 of a method performed by a device that automatically navigates a device GUI to carry out an operation request in accordance with an embodiment. The device (e.g., a switching device as described above) may be coupled to a source device (e.g., a media device) that may provide a video signal representative of the source device's current GUI screen. The method of flowchart 300 may be implemented by system 200 as described above in reference to FIG. 2. Other structural and operational embodiments will be apparent to persons skilled in the relevant art(s) based on the following discussion regarding flowchart 300 and system 200.

In step 302, an operation request is received. For instance, with reference to FIG. 2, one of detectors 226 may receive an operation request from a user to perform a desired action on one of the media devices 204. One of detectors 226 may receive an operation request through a remote control or via a user voice command, or through any other suitable interface. By way of a non-limiting example, an operation request may include a request to launch a particular application or multimedia content (e.g., a television show or a movie). In another embodiment, an operation request may include a request to search one or more media devices for a resource. Operation requests are not limited to the examples provided herein, but can include any operation that may be performed on a GUI of a media device. The operation request need not, however, be tied to a particular media device. In accordance with embodiments, switch 202 may automatically determine, based on mapping component 214, which media device to automatically navigate in response to receiving the operation request that does not identify a media device.

In another embodiment, an operation request may be received via network interface 232. For instance, switch 202 may be coupled to a remote (e.g., cloud-based) server capable of transmitting operation requests directly to switch 202 without a user action. As an example, network interface 232 may receive an operation request to change a configuration setting of one or more media devices 204. For instance, as will be discussed in more detail below, a media device may have configurable settings that enhance the automatic navigation techniques discussed herein. In this scenario, for example, a remote (e.g., cloud-based) server may transmit an operation command to switch 202 via network interface 232 to automatically change a setting of the connected media device. In other embodiments, an operation request may originate from switch 202 itself, e.g., to automatically configure connected media devices in a certain manner or to obtain a list of resources, as will be described in greater detail below.

In step 304, a video signal is received from a media device. For instance, switch 202 may receive a video signal from one of the media devices 204 through an HDMI interface 208, or any other suitable interface (e.g. USB, composite, component, DVI, etc.). In other embodiments, switching circuit 224, based on the operation request, may automatically cause a particular port of the ports 210 to be selected to correspond to the media device for which the operation request is to be carried out. For instance, if a particular application is to be launched, mapping component 214 may automatically determine that a first media device contains the application and port 1 should be selected as a result. In response to selecting the port, a video signal may be received from the media device.

Figure 4:
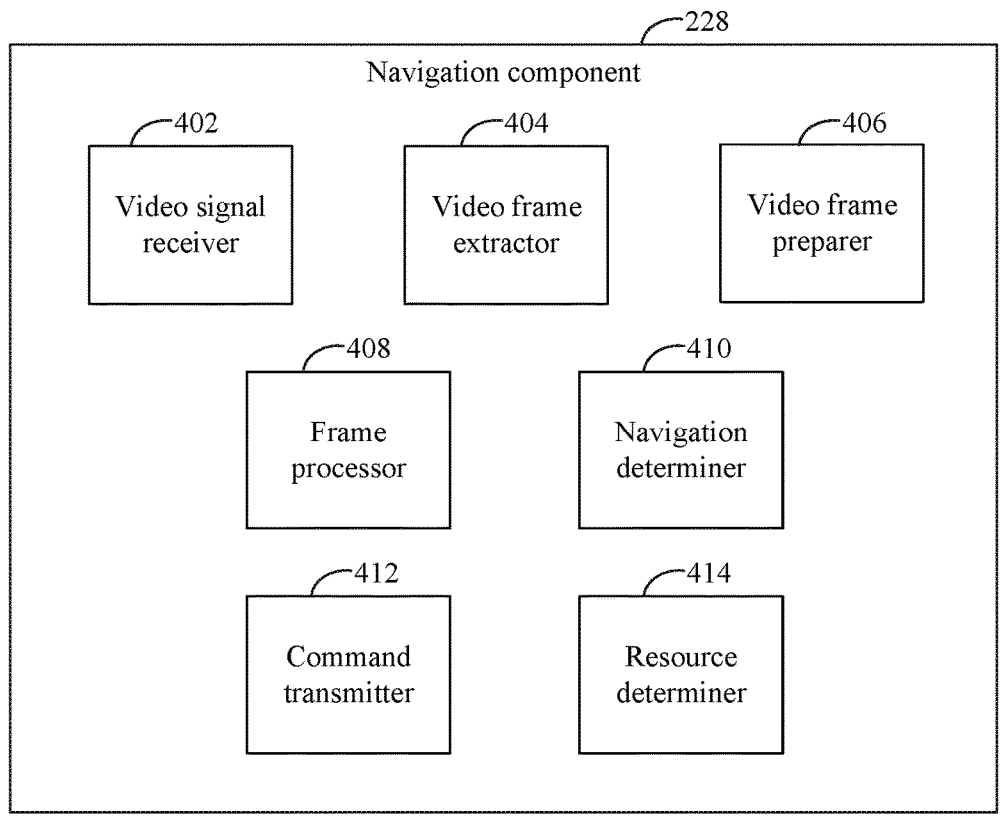
FIG. 4 is a block diagram of a portion of a smart switch configuration, according to an exemplary embodiment.

Before describing subsequent steps of flowchart 300, FIG. 4 will now be described. FIG. 4 is a block diagram of a navigation component implementation 400 of navigation component 228 of FIG. 2. As shown in FIG. 4, navigation component 228 may include a video signal receiver 202 configured to receive a video signal, a video frame extractor 404 configured to extract one or more video frames from the video signal, a video frame preparer 406 configured to pre-process the one or more video frames, a frame processor 408 configured to process the video frames to obtain GUI information, a navigation determiner 410 configured to automatically determine a navigation command, a command transmitter 412 configured to transmit the navigation command to a media device, and a resource determiner 414 configured to determine one or more resources available on a media device. It is contemplated, however, that in various embodiments, one or more components of navigation component 228 as shown in FIG. 4 may not be included and that additional components may be included.

Although it is depicted in FIG. 4 that video signal receiver 402, video frame extractor 404, video frame preparer 406, frame processor 408, navigation determiner 410, command transmitter 412, and resource determiner 414 may be part of a first device (e.g., in navigation component 228 of switch 202), it is contemplated that any one or more of the sub-blocks may be present on another computing device (e.g., a remote server coupled via network interface 232). For instance, in accordance with embodiments described herein, a first device (e.g., switch 202) may comprise one or more processing components to receive the video signal, while a second device (e.g., a remote server, not shown) comprises one or more processing components to extract the one or more video frames, process the one or more video frames, automatically determine the one or more navigation commands, or transmit the one or more navigation commands. In this manner, because the sub-blocks of navigation component 228 shown in FIG. 4 may be carried out by different processing components, additional computing resources of a second device (e.g., a remote server) may be leveraged to increase the speed at which the automatic navigation techniques take place. In addition, by leveraging additional computing resources (e.g., one or more processors) of a second device, the first device (e.g., switch 202) may not need to perform processor intensive activities, which may result in a manufacturing cost reduction of the first device.

In accordance with embodiments, video signal receiver 402 of navigation component 228 is configured to obtain the video signal transmitted by a media device through interface 208, as in step 302 of flowchart 300. In embodiments, video signal receiver 402 intercepts the same, unmodified video signal transmitted over interface 208. The received video signal may comprise a representation of a GUI of a connected media device. For instance, the video signal may contain one or more screens (e.g., a home or menu screen) of the GUI of a connected media device. As an example, if the connected media device is a streaming media device (e.g., an AppleTV® device), the video signal may contain a representation of a screen where one or more objects (e.g., selectable icons or a search field) may be present. The objects may relate to one more resources that are accessible via the streaming media device, such as television shows or movies. In embodiments, the objects may be arranged in a predefined manner, such as in rows, in columns, or in a grid, depending on the particular media device.

Returning now to the description of flowchart 300 of FIG. 3, in step 306, one or more video frames are extracted from the video signal. For instance, with continued reference to FIG. 4, video frame extractor 404 may extract one or more video frames from the video signal obtained by video signal receiver 402. In accordance with embodiments, the extracted video frame(s) may comprise images representing one or more screens of a navigable GUI of a connected media device. For instance, video frame(s) may comprise a still image of one or more objects of a GUI screen of the connected media device. The extracted frame(s) may be stored temporarily, for instance, in storage(s) 222 of switch 202. In one embodiment, video frame extractor 404 may extract the images in a raw or uncompressed form, such as in a red, green, blue (RGB) image format. In another embodiment, video frame extractor 404 may extract images in a YUV image format. In other embodiments, video frame extractor 404 may extract the images in any other suitable format (compressed or uncompressed), or may extract images corresponding to the format of the video signal received via the interface 208 (e.g., in a native image format). In other embodiments, the extracted images may be stored in more than one image format (e.g., in both RGB and YUV formats).

Figure 5:
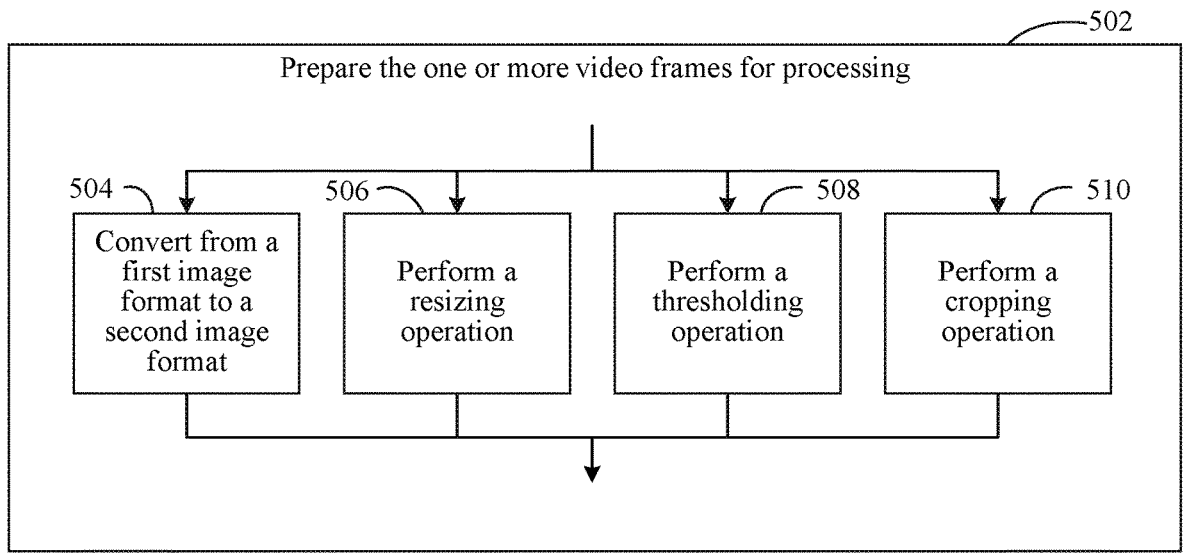
FIG. 5 is a flowchart of a method for preparing one or more video frames for processing, according to an exemplary embodiment.

In accordance with embodiments, the extracted video frame(s) may be modified based one or more pre-processing algorithms. For instance, video frame preparer 406 may perform one or more operations on the extracted video frame(s) to prepare the video frame(s) in order to increase the speed and accuracy of the automatic navigation discussed herein. For example, FIG. 5 is a flowchart 500 of a method for pre-processing one or more video frames. Flowchart 500 is described as follows.

One or more of the extracted video frames are prepared for processing (step 502). In step 504, the one or more video frames are converted from a first image format to a second image format. For instance, video frame preparer 406 may be configured to automatically prepare the one or more video frames for processing by converting the images into a predetermined image format. For instance, video frame extractor 404 may extract video frame(s) from received video signals in several image formats, based on the connected media device and the interface 208 used. As an example, video frame extractor 404 may extract RGB images for a first media device, while it extracts YUV images for a second media device. In embodiments, video frame preparer 406 may automatically convert the images into a predetermined image format (e.g., either RGB or YUV, or any other suitable format).

In step 506, a resizing operation may be performed. For instance, video frame preparer 406 may automatically resize the one or more video frame(s) to a predetermined resolution. Given that it may be unnecessary or inefficient to perform image processing on original sized video frame(s), video frame preparer 406 may resize video frame(s) to a predetermined smaller resolution than the original extracted video frames in embodiments. For example, an original video frame may have a resolution of 1080×720 pixels, or larger. Video frame preparer 406 may automatically resize these video frame(s) to a resolution of 640×360 pixels, or any other suitable resolution without adversely affecting the accuracy the image processing techniques discussed later. In this manner, the storage and processing requirements are reduced and further image processing may be conducted more efficiently, thereby further increasing the user experience via the automatic navigation techniques disclosed.

In step 508, a thresholding operation may be performed on the one or more video frame(s). For instance, video frame preparer 406 may convert the one or more video frame(s) to a binary image based on a predetermined threshold value. By way of example, the one or more video frames may be a color image, a grayscale image, or a color image converted to a gray scale image by video frame preparer 406. During the image thresholding operation, the image may be converted to a binary image (e.g., a black and white image). This type of image segmentation operation may preserve the necessary features of objects present on the GUI screen as represented by the video frame(s), while also simplifying certain processing techniques to be applied later.

In another embodiment, a thresholding operation may be applied to the color intensity values on one or more of a video frame(s)' RGB color channels. For instance, a low threshold value and a high threshold value may be set for one or more of the RGB color channels. Video frame preparer 406 may determine, on a per-pixel basis, whether the intensity values on the RGB color channels fall between the low and high threshold value. If the color intensity value for a given pixel falls within the range, the pixel may be set to '1' corresponding to a white pixel, while pixels falling outside the range are set to '0' corresponding to a black pixel.

In step 510, a cropping operation may be performed. For instance, video frame preparer 406 may remove unnecessary portions of the one or more video frames. As an illustrative example, a video frame containing a representation of a GUI of a media device may contain unnecessary graphics on a periphery of the frame. In another embodiment, selectable objects on a GUI screen may only be present within a portion of the video frame (e.g., in the center of the frame or in the bottom half of the frame). Video frame preparer 406 may be configured to automatically remove the unnecessary areas of the frame through a cropping operation.

Preparing the one or more video frames for processing, however, is not limited to the above pre-processing techniques. Video frame preparer 406 may perform any other operation known to those skilled in the art on the one or more video frames to increase the efficiency and accuracy of the processing functions described later. For instance, video frame preparer 406 may perform any of the above techniques, as well as well as other techniques, that may reduce storage and/or processing requirements of switch 202, without adversely affecting the accuracy of the image processing methods described herein.

In addition, the image preparation techniques described herein are not limited to any particular order. Similarly, it is not necessary to perform each of the steps of each extracted video frame. Rather, video frame preparer 406 may selectively perform any one or more of the above techniques in any order based, for example, on the particular connected media device or based on the video signal received from the media device.

Referring back to the description of flowchart 300 of FIG. 3, in step 308, the one or more video frames are processed to obtain GUI information therefrom. For example, with reference to FIG. 4, frame processor 408 may conduct any number of video processing operations on the one or more video frames to obtain or extract GUI information. For instance, frame processor 408 is configured to process the one or more video frames to determine which selectable objects may be present on the video frame(s) representing the GUI, a proximal location of each selectable object is in relation to other selectable objects, an identity of each selectable object, and/or which selectable object is presently selected or highlighted on the GUI.

Figure 6:
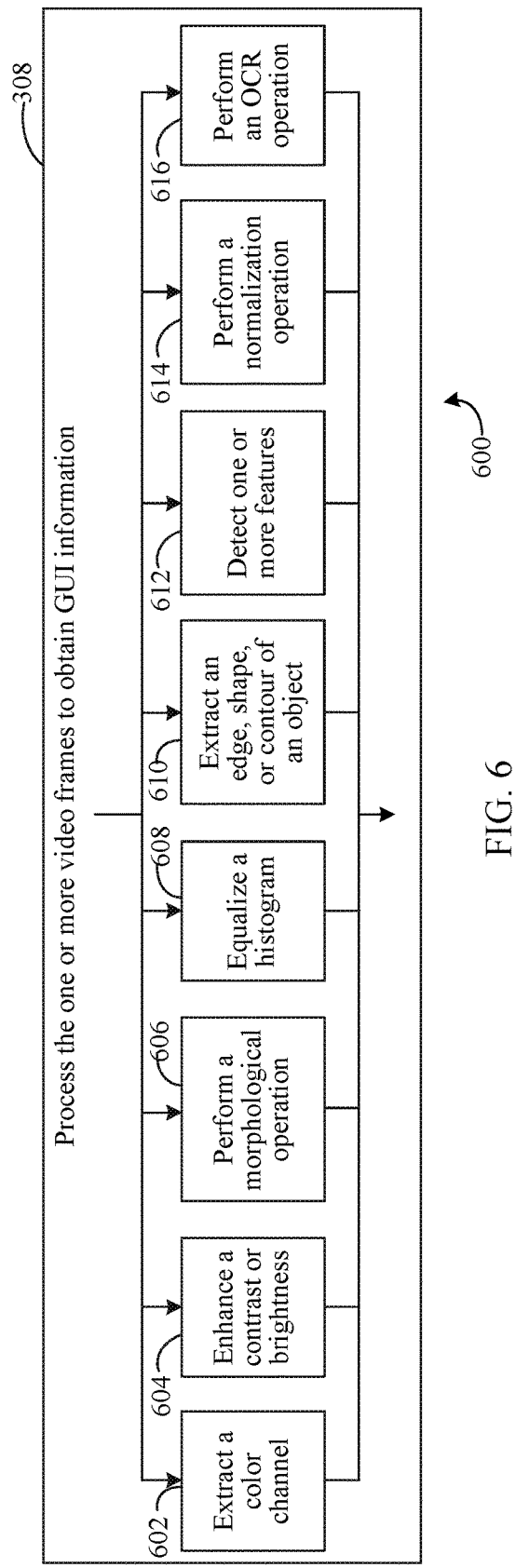
FIG. 6 is a flowchart of a method for processing one or more video frames to obtain GUI information, according to an exemplary embodiment.

In accordance with embodiments, frame processor 408 may process the one or more video frames using any one or more image processing techniques. For instance, frame processor 408 may be configured to process the frames using any suitable algorithm(s) to identify logos, text, images, etc. that may aid in the automatic navigation of the GUI, as will be discussed later. FIG. 6 is an exemplary flowchart 600 for processing the one or more video frames to obtain GUI information therefrom using a variety of processing algorithms. Flowchart 600 is described as follows.

In step 602, a color channel may be extracted. For example, frame processor 408 may determine, based on the content of an RGB color video frame, that one or more particular color channels are of interest. In doing so, frame processor 408 may extract the one or more particular colors from the video frame. As an illustrative example, if an operation request comprised a request to navigate to a resource known to be represented by a predominantly red (or any other color) icon or logo, a red color channel may be extracted in the video frame, thereby permitting frame processor 408 to more easily determine which selectable object from among other objects in the video frame may (or may not) correspond to an operation request.

In step 604, a contrast or brightness may be enhanced. For instance, frame processor 408 may be configured to modify a contrast or brightness to improve dark or underexposed portions of a video frame(s). Enhancing an image to correct for dark or underexposed portions is not limited to contrast and/or brightness adjustments. In embodiments, frame processor 408 may modify any other color component or value of the video frame(s), such as individual RGB channels, to enhance a video frame(s).

In step 606, a morphological operation is performed on the one or more video frames. For example, frame processor 408 may identify portions of a video frame(s) that contain text and shape the identified text into a binary image to increase the accuracy of optical character recognition (OCR) techniques described later. For instance, morphological operations, such as erosion and dilation, may be used in conjunction with an OCR operation, or as a precursor to an OCR operation, to enhance the character recognition. By way of an illustrative, non-limiting example, an erosion operation may be applied to an image (or a portion thereof) that has a dark (e.g., black) background and light (e.g., white) text to make the white lines representing the text thinner, while a dilation operation may make the white lines thicker. By applying a morphological operation as discussed herein, contours around the textual regions in a video frame are more easily obtained, which may increase the accuracy and speed of an OCR operation.

In step 608, a histogram is equalized for the one or more video frames. For instance, frame processor 408 may enhance one or more color intensity values to improve a contrast of an image. In one embodiment, frame processor 408 may equalize a histogram to improve dark or underexposed parts of a frame. In another embodiment, a histogram may be equalized to improve bright or overexposed parts of an image.

In step 610, an edge, shape, or contour of a selectable object may be extracted. For example, frame processor 408 may utilize an algorithm to detect edges in a video, such as a Canny edge detection technique as known and understood to those skilled in the art. Edge detection may be used to locate selectable objects on a video frame and/or identify such objects. For instance, edge detection may be used to extract shapes (e.g., circles or rectangles) that may represent selectable objects on a screen. As an example, a closed contour comprising four sides may be determined to be a rectangle. In another embodiment, edge detection may be further used by frame processor 408 to identify edges, shapes or contours within a particular selectable object, such as a logo associated with an application or multimedia content.

In step 612, feature detection may be applied to the one or more video frames. For instance, many images have features which can be used to define some uniqueness associated with the image. A set of features, for example, such as edges, corners, and blobs can be used to define a logo associated with an executable application or multimedia content. Frame processor 408 may apply any number of known algorithmic processes, or a combination thereof, for feature detection that can be used to enable the identification of a logo. Each feature may have a descriptor, which defines the feature in a bit representation. Features are matched using the descriptors.

Some known techniques for feature detection are a scale-invariant feature transform (SIFT) process, a speeded-up robust features (SURF) process features from accelerated segment test (FAST) process, and an oriented FAST rotated binary robust independent elementary features (BRIEF) (ORB) process.

SIFT and SURF are known proprietary techniques, and ORB is an open source techniques and suitable substitute for SIFT and SURF. ORB is a combination if FAST and BRIEF. FAST is used for feature detection and BRIEF is used for feature matching. Hence using ORB keypoints and descriptors are extracted from the logo that is to be searched. These descriptors are matched with each frame of the video and a FLANN (Fast Library for Approximate Nearest Neighbors) based matcher is used to find the best matches.

In embodiments, storage(s) 222 of switch 202, or a remote storage (e.g., a cloud storage) (not shown) accessible by switch 202, may store a database comprising known resource icons or logos. GUI information obtained from the processed video frame(s) may be matched against the known icons or logos in the database using any of the methods or algorithms described herein.

For instance, image matching, identification or recognition techniques may be utilized in accordance with embodiments disclosed herein, e.g., by searching for and comparing one or more search results in the database to a given/target device, menu, icon, logo, text, etc., e.g., in an attempt to recognize or match the target in whole or in part. A target may be an item in a database for automated image matching or an item identified by a user. For example, extracted icons or logos (e.g. Netflix®, iTunes® TV shows, YouTube®, etc.) may be identified in captured on a media device GUI (e.g., AppleTV®).

In step 614, a normalization operation may be performed. For instance, frame processor 408 may normalize any one or more of the color intensity values of a video frame(s) to enhance a contrast of an image. For instance, where an image (or parts of an image) may be too dark or too bright, a normalization operation may be applied to enhance the contrast of the video frame(s) to an ideal level.

In step 616, an optical character recognition (OCR) operation is performed on the one or more video frames. For instance, frame processor 408 may capture text and blocks of text in any portion of the video frames using any known OCR algorithm. In embodiments, frame processor 408 may automatically determine to group certain letters or words together based on their relative location within the video frame.

Figure 7:
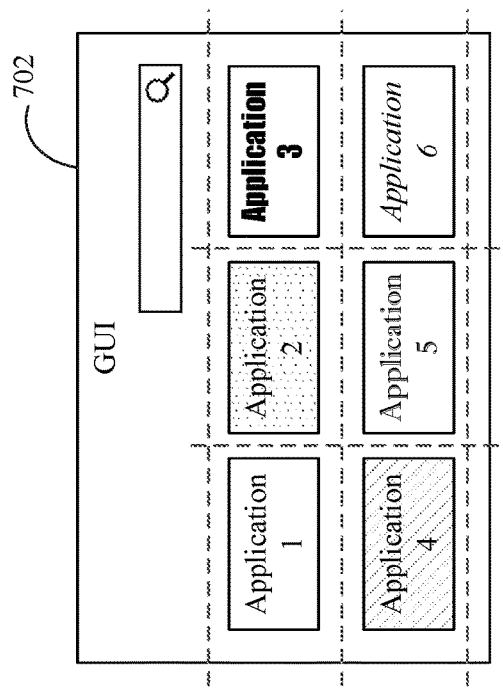
FIG. 7 is an illustrative GUI screen that may comprise icons separated by a grid pattern, according to an exemplary embodiment.

For instance, FIG. 7 depicts an exemplary GUI screen 702 of a media device. In this exemplary GUI screen, selectable icons (e.g., applications) are arranged in a grid pattern. Frame processor 408 may automatically determine, based on processing of the video frame(s) corresponding to the GUI screen that the selectable objects are arranged in a grid pattern. In another embodiment, it may be understood that a particular media device arranges its selectable objects in a particular grid pattern. In such an instance, frame processor 408 may process each individual cell of the grid, rather than process the GUI screen as a whole. For example, if the selectable objects are determined or known to be in a grid pattern, frame processor 408 is configured to automatically group extracted text (e.g., from an OCR operation) for each separate cell of the grid, rather than conducting a single OCR operation across an entire video frame. In this manner, the wording of each selectable icon (e.g., within a particular cell of a grid) is kept together and any extracted text may be accurately mapped to a particular selectable object. The layout of the screen, whether determined as a result of analyzing a video frame(s) or known in advance, is not intended to be used solely for OCR operations. It is understood that the layout of a screen may also be used in conjunction with any other processing technique discussed herein.

Processing the one or more video frames in accordance with embodiments discussed herein are not, however, limited to the above techniques. Frame processor 408 may perform any other operation known to those skilled in the art on the one or more video frames to obtain GUI information therefrom. Frame processor 408 may perform any or more of the above techniques, as well as well as other techniques, that may extract information relating to the location and/or identity of selectable objects on a video frame(s) corresponding to a GUI screen. Furthermore, the processing techniques described herein are not limited to any particular order. Similarly, it is not necessary to perform each of the steps for each video frame. Rather, frame processor 408 may selectively perform any one or more of the above techniques (or other techniques known to those skilled in the art) in any order based, for example, on the video signal received form a connected media device. In other embodiments, frame processor 408 may selectively perform any one or more of the above techniques (or other techniques known to those skilled in the art) based on the operation request received.

In addition, although it is described herein that video frame preparer 406 may perform any number of preprocessing steps on a video frame(s) prior to frame processor 408 processing the video frame, any of the techniques performed by video frame preparer 406 may be performed by frame processor 408, and vice versa. For instance, video frame preparer 406 and frame processor 408 may perform one or more of the preprocessing or processing steps described herein in any order and in any combination.

In embodiments, frame processor 408 may further be configured to receive one or more processing parameters from another device (e.g., a remote server) connected via network interface 232. For instance, a remote server (not shown) may provide additional information (e.g., in a data structure such as a database or the like) to optimize or tailor the performance of frame processor 408 for one or more media devices. In one embodiment, the remote server may transmit such parameters (or alternatively, switch 202 may download the parameters to store, e.g., in storage 202) at periodically or aperiodically. In other embodiments, switch 202 may obtain access the parameters from the remote server in real-time during or prior to each automatic navigation procedure.

The remote server may identify, for example, which one or more algorithms should be used for one or more media devices, how the algorithms should be used, in what order to apply the algorithms during the processing (or preprocessing) step, or provide additional processing algorithms to utilize to carry out an operation command. As an example, a remote server may indicate that a particular media device arranges its selectable objects in a particular grid (e.g., a 5×5 grid). Using this information, frame processor 408 can automatically process the one or more video frames based on the known grid pattern. In another example, a remote server may provide a database (or the like) of icons or logos that frame processor 408 may utilize during a feature detection step for a particular media device or application for matching or identification purposes.

In another example, a remote server may provide information regarding the nesting of various GUI screens of a particular media device to facilitate the automatic navigation procedure described herein. In other embodiments, a remote server may determine additional (or modified) algorithms to facilitate the automatic navigation based on monitoring a plurality of users' manual navigations of media device GUI screens. For example, a remote server may monitor a manual navigation of a user of a particular media device, and determine that the user manually navigated the GUI of the media device in a certain manner to launch a particular resource. The remote server may incorporate such manual navigation information into a new or modified algorithm, which may be obtained by frame processor 408 to further optimize the automatic navigation techniques described.

Embodiments are not limited to these illustrative examples. Rather, a remote server (e.g., a cloud-based server) may provide any other type of information (e.g., information regarding one or more algorithms, GUI screens, icons, logos, operation commands, etc.) that may be used in any manner for the purpose of facilitating the processing of the one or more video frames.

In this manner, improvement to one or more algorithms used by frame processor 408 may be constantly obtained, thereby increasing both a speed and accuracy of the system. Additionally, given that device manufacturers are constantly updating GUI screens (e.g., changing a layout, changing icons/logos within a screen, changing a menu structure, etc.), frame processor 408 may be configured to automatically receive updated processing parameters from a remote server to further facilitate the processing in response to an updated device GUI.

In accordance with embodiments disclosed herein, once frame processor 408 processes the one or more video frames to obtain GUI information therefrom, the video frames are no longer needed and may be discarded.

Referring back to the description of flowchart 300 of FIG. 3, in step 310, a determination is made if the GUI is in a state to carry out the received operation request. For instance, navigation determiner 410 may determine, based on the GUI information obtained from the one or more processed frames, whether the operation request may be carried out. As an example, a currently selected object may appear larger in size compared to other selectable objects on the screen. In another embodiment, the currently selected object may be highlighted or contain other outlining or features that distinguish it from other non-selected objects present on the GUI. Based on this GUI information, navigation determiner 410 may determine whether a currently selected object on the GUI corresponds to the operation request. For example, if an operation request comprised a request to launch a particular application or multimedia content, the GUI information obtained from processing the one or more video frames may indicate whether the desired application or multimedia content is presently selected on the GUI. If the currently selected object does not correspond to the operation request, the flow proceeds to step 312, otherwise to step 316.

Figure 11A:
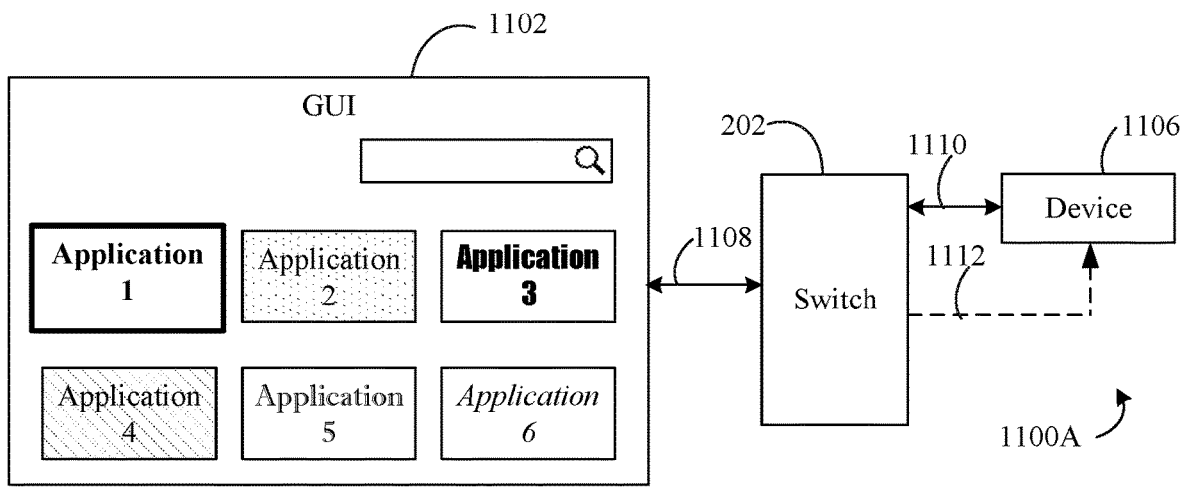
FIGS. 11A-11C are block diagrams of an illustrative automatic navigation of a GUI of a media device, according to an exemplary embodiment.
Figure 11B:
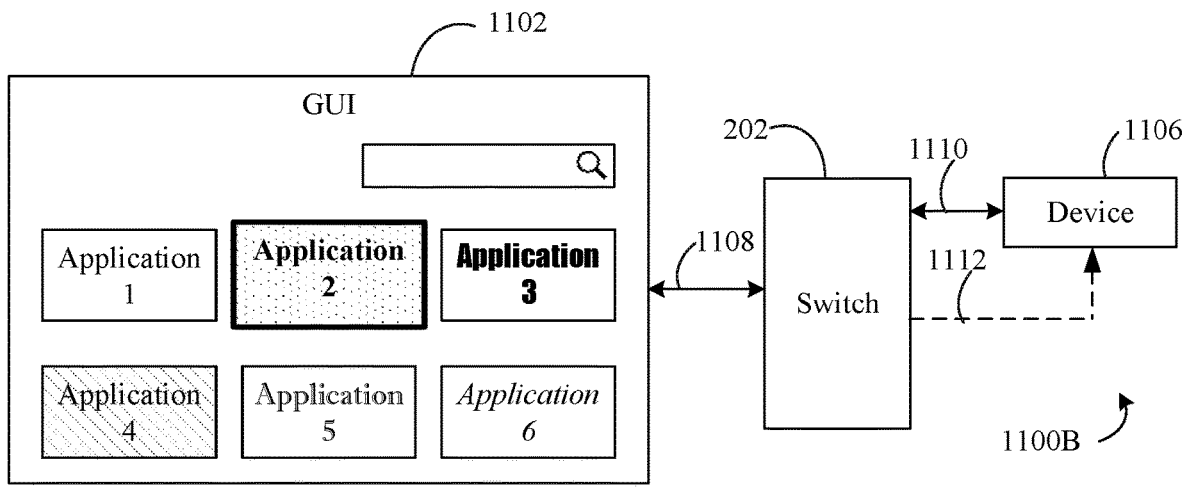
Figure 11C:
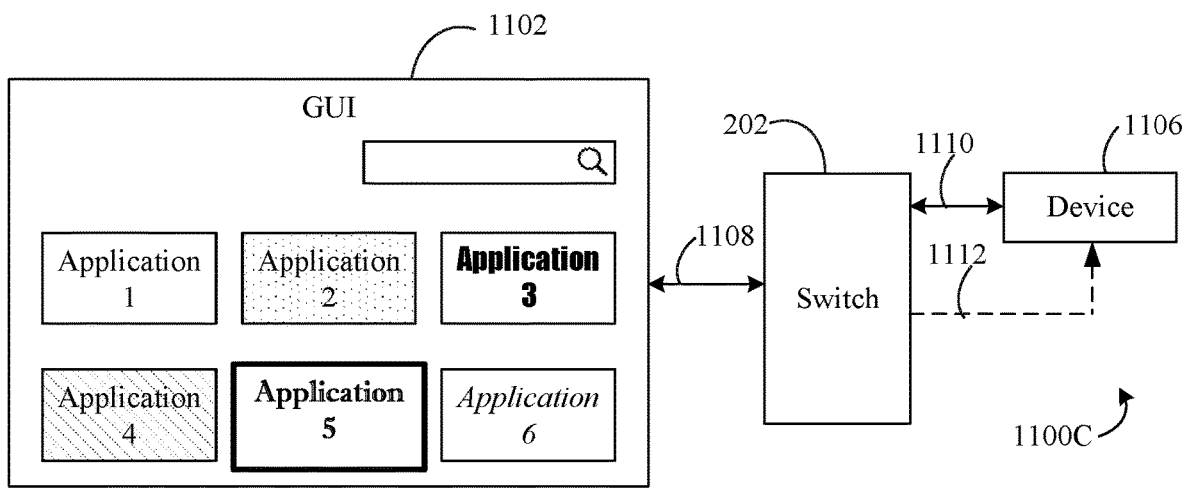

In step 312, in response to determining that that the GUI is not in a state to carry out the operation request, one or more navigation commands to apply to the GUI are determined. For instance, navigation determiner 410, based on the GUI information and the operation request, may automatically determine one or more navigation commands to issue to the GUI. In accordance with embodiments, GUI information extracted from the processed video frames may indicate a plurality of selectable objects present on a GUI screen, along with a currently selected object. The GUI information may further include a location of a selectable object (e.g., a desired resource to launch) corresponding to the operation request. Based on this GUI information and the operation request, navigation determiner 410 may determine one or more navigation steps to carry out in order to land on the selectable object corresponding to the operation request. For example, navigation determiner 410 may automatically determine that a cursor representing a selected object should move one spot in the 'right' direction, followed by one spot in the 'down' direction to arrive at the desired object. As will be described in greater detail below, FIGS. 11A-11C provides a non-limiting illustrative example of such a navigation.

In many media devices, multiple successive screens of a GUI may need to be navigated before arriving at a screen in which an object corresponding to the operation request is located. For example, in an exemplary media device, a desired application to launch may not be located on a first GUI screen listing a subset of the available applications. In such an embodiment, the GUI may need to be further navigated by scrolling the list to obtain additional results, or by clicking a 'next' page icon, or the like. In such embodiments, if GUI information of a processed video frame(s) does not identify the selectable object corresponding to the operation request, navigation determiner 410 may automatically determine to navigate to an icon or object causing the GUI screen to scroll or move to another page to obtain additional results.

Figure 13B:
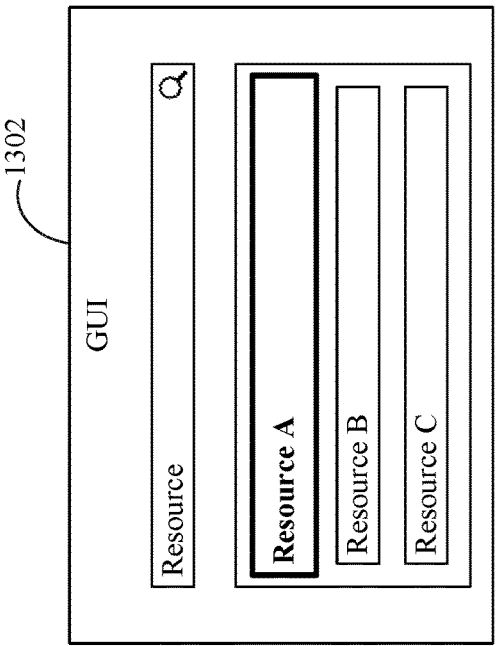
FIGS. 13A and 13B are illustrative GUI screens of a media device that may be automatically navigated to carry out a search, according to an exemplary embodiment.
Figure 13A:
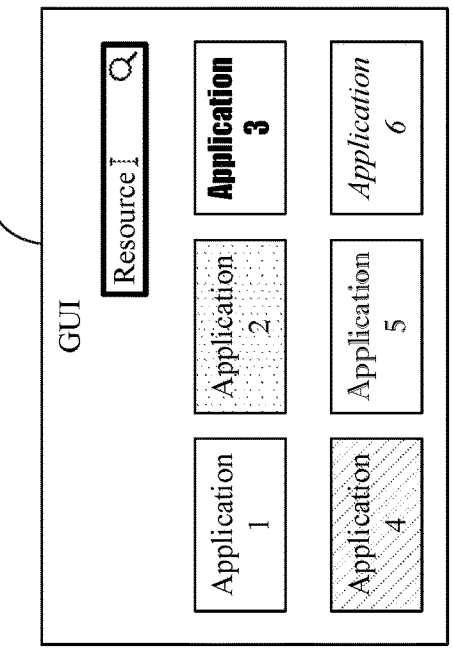

In another embodiment, navigation determiner 410 may automatically determine the navigation commands necessary to arrive at a 'search' field, and automatically insert and search for the desired object. FIGS. 13A and 13B provide a non-limiting illustrative example of such a navigation. In this manner, navigation determiner 410 can automatically browse either a plurality of screens or directly search for a desired object in order to locate the object with minimal or reduced user involvement.

In embodiments, navigation determiner 410 may determine any number of successive commands to apply to the GUI based on the GUI information and the operation request. For instance, as discussed in the illustrative example above, navigation determiner 410 may determine that a cursor should move one spot in the 'right' direction and one spot in the 'down' direction to arrive at the desired object. In this example, navigation determiner 410 may determine that a single navigation command to move the cursor in the 'right' direction should be applied and confirmed or verified in a subsequently processed video frame(s) prior to applying a second navigation command to move in a 'down' direction. In this scenario, the single navigation command may be transmitted for application to the GUI, followed by repeating certain steps of the flowchart until the GUI is in a desired state. In other embodiments, navigation determiner 410 may determine to apply multiple navigation commands in succession (e.g., a 'right' command immediately followed by a 'down' command) to increase the speed of the automatic navigation.

In step 314, the one or more navigation commands for application to the GUI are transmitted. For instance, with reference to FIG. 4, command transmitter 412 transmits the one or more navigation commands for application to the connected media device. The one or more transmitted navigation commands may cause the GUI screen of the connected media device to change. For instance, the one or more navigation commands may cause a selected object on the GUI screen to move to a different selectable object (e.g., to a desired resource or a selectable object one or more spots closer to the desired resource). In another embodiment, the one or more navigation commands may cause the GUI screen to scroll to show additional selectable objects or show a different page of selectable objects. In yet another embodiment, the one or more navigation commands may cause the GUI screen to select or launch a text input field in a search box. The examples described herein, however, are not limiting. The transmitted navigation command may cause the GUI screen to be navigated in any manner that a user may manually navigate through traditional means, such as via a remote control.

In an embodiment, command transmitter 412 may cause transmitter 230 of switch 202 to transmit the one or more navigation commands via signal 234 to the connected media device. Transmitter 230 may transmit the one or more navigation commands to the connected media device using any one or more protocols. In one embodiment, transmitter 230 may comprise an IR emitter that transmits the one or more navigation commands to the connected media device via an IR signal. In another embodiment, transmitter 230 may comprise an RF transmitter that may be configured to transmit an RF signal containing the one or more navigation commands to the media device. For instance, the RF signal may be transmitted in accordance with various known standards, e.g., Bluetooth™, as described in the various standards developed and licensed by the Bluetooth™ Special Interest Group, technologies such as ZigBee® that are based on the IEEE 802.15.4 standard for wireless personal area networks, NFC, other RF-based or IP-based communication technologies such as any of the well-known IEEE 802.11 protocols, etc.), and/or the like.

In another embodiment, transmitter 230 may transmit signal 234 to the connected media device any type of wired connection suitable of communicating navigation commands (e.g., via a USB cable, coaxial cable, etc.). Many consumer electronics devices may further support IP connectivity and control. Such devices can be discovered on an IP network and then controlled over the IP network to perform required actions (e.g., power toggle, home screen navigation, etc.). In such embodiments, command transmitter 412 may cause network interface 232 to transmit an IP-based communication signal 234 comprising the one or more navigation commands to the connected media device. In a further embodiment, command transmitter 412 may utilize an HDMI port to which the media device is connected to transmit an HDMI-CEC signal over an HDMI interface 208.

Upon transmitting the one or more navigation commands to the connected media device, the flow proceeds back to step 304. In this manner, upon applying the one or more navigation commands to the GUI of the connected media device, the process repeats in an iterative manner until the GUI is in a state to carry out an operation request.

In embodiments, after command transmitter 412 causes transmitter 230 of switch 202 to transmit the one or more navigation commands via signal 234 to the connected media device, GUI information may be obtained from one or more additional video frames to determine whether the one or more navigation commands were received by the media device. For instance, navigation determiner 410 may verify, based on GUI information of the one or more additional video frames, whether the media device responded in an expected manner following transmission of the one or more navigation commands. In this manner, navigation determiner 410 may verify whether the one or more navigation commands were successfully applied to the GUI of the media device. As an illustrative example, if signal 234 comprised a command to navigate 'right' one spot on the GUI, GUI information obtained from one or more additional video frames may indicate that the selected object on the GUI has changed to an object immediately to the right of a previously selected object. If it is determined that the one or more navigation commands were not successfully applied (e.g., if the media device did not receive signal 234), command transmitter 412 may cause transmitter 230 to retransmit the one or more navigation commands for application on the media device until the one or more navigation commands are successfully applied using any one or more of the protocols discussed previously.

In step 316, if it has been determined that the GUI is in a state to carry out an operation request, an operation command may be transmitted for application to the GUI of the connected media device. For instance, command transmitter 412 may transmit an operation command corresponding to the operation request for application on the GUI of the connected media device. As an example, if an operation request comprised a request to launch a particular application on a media device, command transmitter 412 is configured to transmit signal 234 to the connected media device to launch the application once it is located and selected on the GUI. Operation commands disclosed herein are not limited to commands to launch a resource, but rather may comprise any type of command transmitted to the connected media device to launch, execute, select, or activate a particular object, option, or field on the GUI. In embodiments, the operation command may be transmitted to the connected media device using any suitable protocol as discussed above with respect to step 314.

In step 318, a determination is made whether an additional operation command is necessary to carry out the operation request. For instance, navigation determiner 410 may determine whether additional actions are to be performed on the connected media device to complete the operation request. In an embodiment, an operation request may require more than one operation command to be transmitted for application to the GUI to complete a request. As an example, if an operation request comprises a request to launch certain multimedia content that can be accessed only upon executing a particular application, navigation determiner 410, using the techniques described here, is configured to first automatically locate, select, and execute the application.

Upon executing the application, navigation determiner 410 determines that an additional operation command (e.g., locating, selecting, and launching the multimedia content) is needed to carry out the operation request. Upon making that determination, the flow reverts back to step 304, where an iterative process may be repeated until the multimedia content is located, selected, and launched using the automatic navigation techniques. If it is determined that no additional operation commands are needed to carry out the operation request (e.g., the operation request has been completed by launching the multimedia content), the flow ends at step 320.

In embodiments, switch 202 may be configured to output the video signal received from the connected media device to one or more sink devices 206 while navigation component 228 automatically navigates the media device in the manner described herein. For example, the one or more sink devices 206 may display the automatic navigation in real-time. In other embodiments, switch 202 may output an alternative GUI on one or more sink devices 206 to mask the automatic navigation, such that the connected media device does not transmit a video signal to a sink device during the automatic navigation. For instance, an alternative GUI may indicate to a user that an automatic navigation is in progress, while navigation component 228 navigates the media device in the background. In this example, switch 202 may be configured to automatically couple the connected media device to the one or more sink devices 206 upon completion of the operation request.

In some example embodiments, one or more of operations 302, 304, 306, 308, 310, 312, 314, 316, and/or 318 of flowchart 300 may not be performed. Moreover, operations in addition to or in lieu of operations 302, 304, 306, 308, 310, 312, 314, 316, and/or 318 may be performed. Further, in some example embodiments, one or more of operations 302, 304, 306, 308, 310, 312, 314, 316, and/or 318 may be performed out of order, in an alternate sequence, or partially (or completely) concurrently with each other or with other operations.

In the above manner, navigation component 228 can automatically navigate a connected media device's GUI, irrespective of the brand of the media device, the layout of the GUI, and the desired operation request to be carried out. By analyzing the content contained on the GUI screen in real-time, navigation component 228 can automatically determine one or more navigation steps needed to carry out an operation request, and transmit the appropriate commands for application on the GUI with minimal or reduced user interaction. This technique eliminates the need for a user to manually operate a remote control associated with a media device to locate, select, and carry out a desired action. As will be explained in greater detail below, the methods described herein may be used in a variety of exemplary contexts to automatically navigate a connected media device.

It will be understood and appreciated that the example embodiments discussed herein are not intended to be read in a vacuum. It is contemplated that any of example embodiments, or features discussed therein, may be combined with any other embodiments disclosed herein.

1. Example Automatic GUI Object Selection Embodiments

Figure 8:
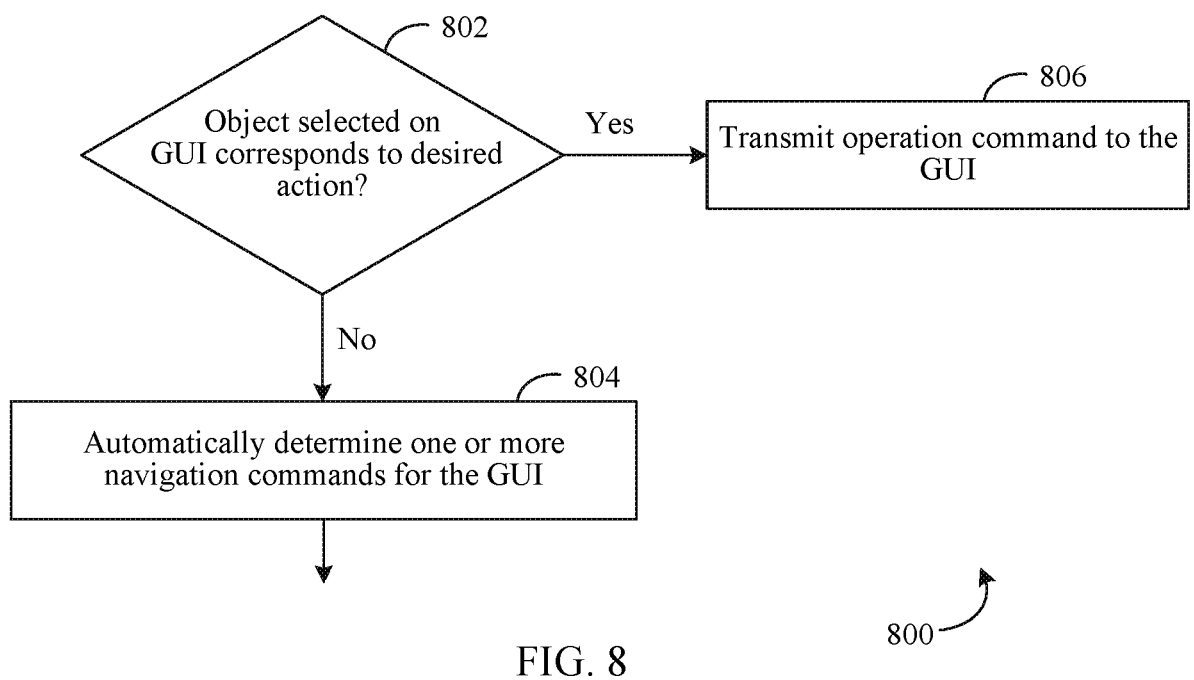
FIG. 8 is a flowchart of a method for transmitting an operation command to a GUI, according to an exemplary embodiment.

In an embodiment, automation navigation of a media device may be used to automatically transmit an operation command, based on GUI information extracted from one or more video frames, to select an object on the GUI. For instance, FIG. 8 depicts a flowchart 800 of a method for automatically navigating a media device based on a determination whether an object on a screen corresponds to a desired action. The method of flowchart 800 may be implemented by system 200 as described above in reference to FIG. 2 and navigation component 228 as described in reference to FIG. 4. Other structural and operational embodiments will be apparent to persons skilled in the relevant art(s) based on the following discussion regarding flowchart 800, system 200, and navigation component 228.

In step 802, a determination is made whether an object selected on the GUI screen corresponds to a desired action. In an embodiment, step 802 is an example implementation of step 310 described with reference to FIG. 3. For instance, navigation determiner 410 may determine, based on the GUI information, whether an object selected on the screen corresponds a desired action (e.g., an operation request).

For example, a GUI may indicate which object on the GUI screen is currently selected in a variety of ways. Icons and/or GUI screens may be displayed differently, for example, when an icon is selected or highlighted (e.g. by placing cursor over icon without selecting) and not selected or highlighted in a GUI screen. In one embodiment, the size of a selected object on the GUI screen may be enlarged compared to an unselected state, or may appear larger in size than other non-selected objects. In another embodiment, a selected object may contain a border, or different border (e.g., a thicker border) compared other non-selected objects. In yet another embodiment, a selected object on the GUI screen may be identified by highlighting the selected object, or any other manner in which the colors or brightness may be altered. In another example, selected icons may be provided with textual description and/or relocated while a GUI screen preview pane may change to show previews of the selected icon. It is understood and appreciated that a GUI may identify a selected object in any number of ways, and is not limited to the examples discussed herein.

In an embodiment, as discussed above with reference to FIG. 3, frame processor 408 is configured to processes one or more video frames to obtain GUI information, including which selectable objects may be present on a screen, as well as which one of the selectable objects is currently selected. For instance, using any of the processing techniques described above (e.g., with reference to FIG. 6), a determination may be made regarding which object on a GUI screen is presently selected. For example, if the desired action (e.g., an operation request) was to launch a particular application, the navigation determiner 410 may determine, based on the GUI information, whether the particular application is selected on the GUI screen. If not, the flow proceeds to step 804, otherwise to step 806.

In step 804, if it is determined that an object selected on the GUI screen does not correspond to a desired action, one or more navigation commands are automatically determined for application to the GUI. For instance, the automatic determination of one or more navigation commands in step 804 may be carried out in a manner similar to step 312 of FIG. 3. Once navigation determiner 410 automatically determines the one or more navigation commands, the navigation commands may be transmitted to the GUI, and the flow may proceed in an iterative manner described above with reference to FIG. 3 until an object currently selected on the GUI corresponds to the desired action.

In step 806, if it is determined that an object selected on the GUI screen corresponds to the desired action, an operation command is transmitted to the GUI. For instance, transmitting an operation command in step 806 may be carried out in a manner similar to step 316 of FIG. 3. As discussed with reference to FIG. 3, if additional operation commands are needed, the flow may proceed in an iterative manner, otherwise the flow ends. For instance, if the desired request (e.g., operation command) was to launch a particular application and navigation determiner 410 determines, based on the GUI information that the application is currently selected on the GUI screen, command transmitter 412 may transmit an operation command to launch the application. In this situation, the application is launched via the GUI and the flow ends.

Flowchart 800, however, is not intended to be limiting to launching a particular application on a media device. The techniques described with reference to flowchart 800 may be utilized irrespective of the desired action. For example, navigation determiner 410 may determine, based on GUI information, whether any selectable object is currently selected, including applications, multimedia content, a search field, a configuration setting, or any other object that may be selected on a GUI screen.

In some example embodiments, one or more of operations 802, 804, and/or 806 of flowchart 800 may not be performed. Moreover, operations in addition to or in lieu of operations 802, 804, and/or 806 may be performed. Further, in some example embodiments, one or more of operations 802, 804, and/or 806 may be performed out of order, in an alternate sequence, or partially (or completely) concurrently with each other or with other operations.

2. Example Application and Content Launching Embodiments

In embodiments, automatically navigating a media device consistent with the techniques described herein may include automatically launching both an application and desired content within the application. For example, in one embodiment, an operation command may include a request to launch particular multimedia content. Based, for instance, on mapping component 214, navigation determiner 410 is able to determine that the multimedia content may be accessed through an executable application on a media device. In other embodiments, the operation request may identify both the application and the media content within the application to be launched. In accordance with these example embodiments, the automatic navigation techniques may be used to carry out the operation request by launching both the application and the multimedia content within the application.

Figure 9:
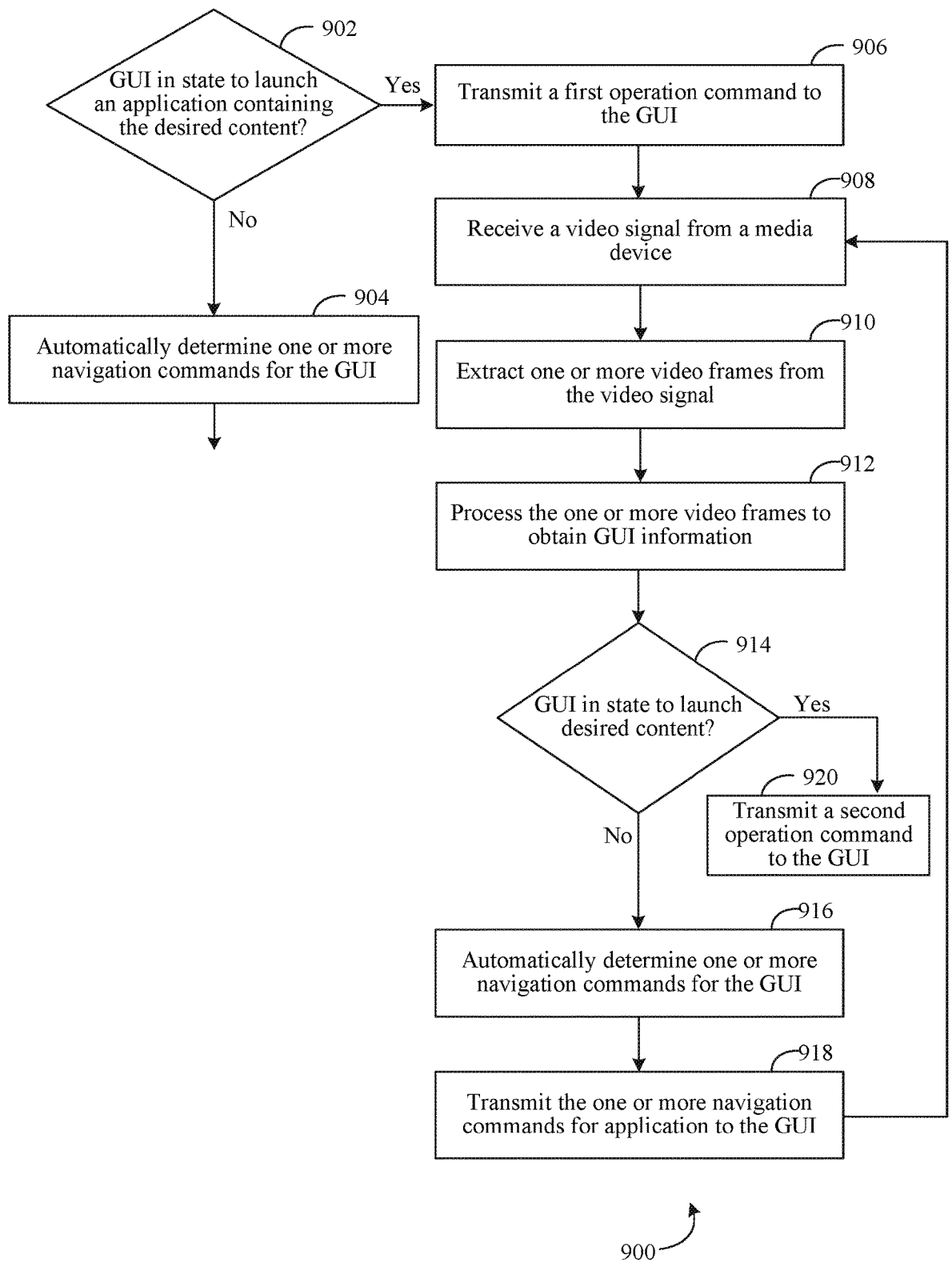
FIG. 9 is a flowchart of a method for automatically launching multimedia content within an application, according to an exemplary embodiment.

For example, FIG. 9 depicts a flowchart 900 of a method for automatically launching content within an executable application. The method of flowchart 900 may be implemented by system 200 as described above in reference to FIG. 2 and navigation component 228 as described in reference to FIG. 4. Other structural and operational embodiments will be apparent to persons skilled in the relevant art(s) based on the following discussion regarding flowchart 900, system 200, and navigation component 228.

In step 902, a determination is made whether the GUI is in a state to launch an application containing the desired content. For instance, navigation determiner 410 may determine, based on GUI information extracted from one or more video frames, whether the GUI is in a state to launch an application. This determination may be made, for example, in a manner similar to step 310 described above with reference to FIG. 3 based on the GUI information extracted from one or more video frames. If the GUI is not in a state to launch the application, the flow proceeds to step 904, otherwise to step 906.

In step 904, if it is determined that the GUI is not in a state to launch the application containing the desired content, one or more navigation commands are automatically determined for application to the GUI. For instance, the automatic determination of one or more navigation commands in step 904 may be carried out in a manner similar to step 312 of FIG. 3. Once navigation determiner 410 automatically determines the one or more navigation commands, the navigation commands may be transmitted to the GUI, and the flow may proceed in an iterative manner described above with reference to FIG. 3 until the GUI is in a state to launch the application containing the desired content.

In step 906, if it is determined that the GUI is in a state to launch the application containing the desired content, a first operation command is transmitted to the GUI. For instance, transmitting an operation command in step 906 may be carried out in a manner similar to step 316 of FIG. 3.

Once the application containing the desired content has been launched in response to transmitting the operation command to the media device, a similar iterative process may commence to automatically navigate the GUI to launch the desired multimedia content.

In step 908, for example, a video signal containing a representation of the GUI of the media device after an application has been launched is received from the media device. In step 910, one or more video frames are extracted from the video signal. In step 912, the one or more video frames are processed to obtain GUI information. In embodiments, steps 908, 910, and 912 may be performed in a manner as described above with respect to steps 304, 306, and 308 of FIG. 3. In this manner, navigation determiner 410 may determine in step 914, based on the obtained GUI information, whether the GUI screen is in a state to launch the desired multimedia content. If not, the flow proceeds to step 916, otherwise to step 920.

In step 916, if it is determined that the GUI screen is not in a state to launch the desired multimedia content, the media device may be automatically navigated in an iterative process as discussed above until the GUI screen is in a state to launch the desired content. In particular, navigation determiner 410 may automatically determine one or more navigation commands to apply to the GUI in step 916. In step 918, in response to determining the one or navigation commands, command transmitter 412 is configured to transmit the one or more navigation commands for application to the GUI of the media device. In embodiments, steps 916 and 918 of FIG. 9 may be performed in a manner similar as described above with respect to steps 312 and 314 of FIG. 3. Once command transmitter 412 transmits the one or more navigation commands to the media device, the GUI screen may change in response to the received commands. Accordingly, the flow reverts to step 908 in which video signal receiver 402 may receive a video signal comprising a representation of the GUI.

In step 920, if it is determined that the GUI is in a state to launch the desired multimedia content, a second operation command is transmitted to the GUI. For instance, transmitting a second operation command in step 920 may be carried out as described above in a manner similar to step 316 of FIG. 3. Upon transmitting the second operation command to the GUI, the media device launches the desired multimedia content and the flow ends. In this manner, the user need not navigate the media device using a remote control to locate an application, launch an application, locate multimedia content within the application, and launch the multimedia content manually. Rather, upon receiving an operation command, navigation component 228 may automate the entire process with minimal or reduced user involvement.

In some example embodiments, one or more of operations 902, 904, 906, 908, 910, 912, 914, 916, 918, and/or 920 of flowchart 900 may not be performed. Moreover, operations in addition to or in lieu of operations 902, 904, 906, 908, 910, 912, 914, 916, 918, and/or 920 may be performed. Further, in some example embodiments, one or more of operations 902, 904, 906, 908, 910, 912, 914, 916, 918, and/or 920 may be performed out of order, in an alternate sequence, or partially (or completely) concurrently with each other or with other operations.

Figure 12:
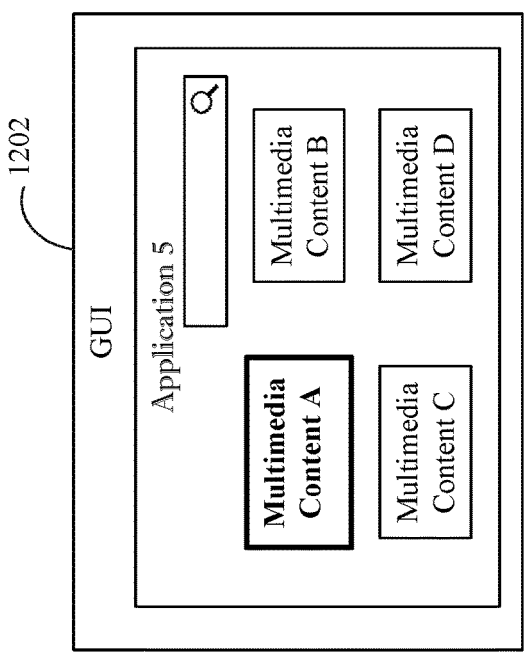
FIG. 12 is an illustrative GUI screen of a media device that may be automatically navigated in accordance with an exemplary embodiment.

For example, automatically navigating a GUI to launch an application and multimedia content within an application in accordance with flowchart 900 is illustrated in FIGS. 11 and 12. In FIGS. 11 and 12, an illustrative example is depicted in which a particular multimedia content (e.g., "Multimedia Content A") is intended to be launched, which may be accessed upon executing a certain application (e.g., Application 5). FIGS. 11 and 12 are not intended to be limited to a particular GUI or a particular media device, but rather depicts an exemplary embodiment depicting the operation of flowchart 900.

Turning now to FIG. 11A, a device connection block diagram 1100A is shown. For example, switch 202 is connected to television (e.g., a sink device) having a GUI 1102 over an HDMI connection 1108. A source device 1106 (e.g., a streaming media device) is to be connected by a cable to form an HDMI connection 1110. HDMI connection 1110 allows video data to be provided by source device 1106 to the TV coupled to switch 202 via the HDMI connection 1108. HDMI connection 1110 further allows a video signal containing a representation of one or more GUI screens of source device 1106 to be received by switch 202. Switch 202 is also configured to transmit a signal 1112 to device 1106 to control one or more functions of device 1106, including but not limited to functions related to one or more GUI screens of device 1106.

GUI 1102 of device 1106 may contain a number of selectable objects as illustrated in FIG. 11A. In this example, GUI 1102 may contain a search input field, and six applications, each represented by their own respective selectable objects. GUI 1102 can, however, contain any number of selectable objects and may be arranged in any manner. GUI 1102 may also contain additional pages or screens in which additional selectable objects may be located. In another embodiment, GUI 1102 may contain a menu option, or other configurable setting option which may enable the configuration of device 1106. In other embodiments, selectable icons need not contain a text field (e.g., "Application 1"). Rather, selectable icons may be denoted using icons logos, or any suitable graphic for identifying a particular resource.

The exemplary GUI screen illustrated in FIG. 11A may comprise a home screen of a GUI. For instance, GUI 1102 as depicted in FIG. 11A may appear upon powering on device 1102 or navigating to a home screen. In other embodiments, GUI 1102 as shown in FIG. 11A may appear after navigating to an 'Applications' folder or directory, or the like. Such navigation may be accomplished automatically in accordance with the techniques disclosed herein.

As illustrated in FIG. 11A, a first application (e.g., Application 1) is presently selected on GUI 1102. Using the techniques described herein, video signal receiver 402 receives from device 1106 a video signal comprising the representation of the GUI 1102 depicted in FIG. 11A. Video frame extractor 404 may extract one or more video frames from the received video signal, which may comprise one or more still images of GUI 1102. Frame processor 408 processes the one or more frames to obtain GUI information therefrom. For instance, with reference to GUI 1102 illustrated in FIG. 11A, GUI information may indicate that the current GUI screen contains six applications (e.g., Applications 1-6) arranged in a grid pattern. GUI information may further indicate that a first row contains three applications (e.g., Applications 1-3), and a second row below it contains three additional applications (e.g., Applications 4-6). GUI information may also identify a search input field near the top of the GUI screen. In accordance with embodiments, GUI information extracted from the one or more frames may further indicate that a first application (e.g., Application 1) is presently selected based on the selectable object corresponding to the first application appearing larger in size than the remaining applications and/or containing a darkened border.

In accordance with the techniques described herein, navigation determiner 410 determines whether the GUI 1102 is in a state to launch the application (e.g., Application 5) containing the desired content. In the illustrated example, navigation determiner 410 determines that the GUI is not in a state to launch the application because the desired application is not presently selected. As a result, navigation determiner 410 automatically determines one or more navigation commands to transmit for application to the GUI to cause the desired application to be selected. In this illustrative example, navigation determiner 410 may automatically determine that several navigation commands are needed. For instance, navigation determiner 410 may determine that the GUI should be navigated by first transmitting a 'right' command followed by a 'down' command via signal 1112.

For example, FIG. 11B illustrates a device connection block diagram 1100B of GUI 1102 after receiving a navigation command to go 'right.' As shown in FIG. 11B, GUI 1102, in response to receiving the navigation command to go 'right' via signal 1112, a different application (e.g., Application 2) is selected on GUI 1102. In this example, because the desired application has not yet been selected, the iterative process of receiving a video signal, extracting one or more video frames, processing the one or more video frames, and determining whether the GUI is in a state to carry out the operation request may repeat until the desired application is selected.

For example, continuing with the same illustrative example, FIG. 11C illustrates a device connection block diagram 1100C of GUI 1102 after receiving an additional navigation command to go 'down.' As illustrated in GUI 1102 of FIG. 11C, based on the GUI information extracted from the one or more video frames, navigation determiner 410 determines that the desired application (e.g., Application 5) is now currently selected in the GUI. As a result, command transmitter 412 may transmit an operation command (e.g., an 'enter' or 'select' command, or the like) to device 1106 for application to the GUI to execute the desired application. Upon receiving the operation command, device 1106 executes the desired application. It is noted, however, that instead of transmitting one single navigation command at a time in this illustrative example, command transmitter 412 may transmit multiple navigation commands immediately following each other (e.g., a 'right' command immediately followed by a 'down' command) to cause the GUI to perform multiple navigation steps back-to-back to select the appropriate application.

Further continuing with this illustrative example, a particular piece of multimedia content (e.g., Multimedia Content A) is desired to be launched. For instance, FIG. 12 illustrates an exemplary GUI 1202 of device 1106 that may be automatically navigated. For instance, in FIG. 12, GUI 1202 may comprise one or more selectable icons representing multimedia content upon launching a particular application (e.g., Application 5). GUI 1202 may be navigated in a similar way as discussed above to launch the desired multimedia content. For instance, an iterative process of receiving a video signal, extracting one or more video frames, processing the one or more video frames, and determining whether the GUI is in a state to launch the multimedia content may repeat until the desired content is selected on the GUI screen. In the illustrative example depicted in FIG. 12, based on the extracted GUI information, navigation determiner 410 determines that the desired multimedia content (e.g., Multimedia Content A) is presently selected upon launching the application. As a result, navigation determiner 410 need not transmit further navigation commands to navigate to the appropriate selectable icon. Instead, command transmitter 412 may transmit a second operation command to launch the desired multimedia content. Although not illustrated in this example, if the operation request instead comprised a request to launch a different item of multimedia content (e.g., Multimedia Content C), the automatic navigation techniques described above may similarly be applied to GUI 1202 to select and launch the different item of content.

It is noted that the above illustrative example may apply to GUI screens with any number of nested menus or folders. For instance, upon selecting a particular piece of multimedia content, a further listing may be provided on a GUI screen (e.g., seasons or episodes of a television show). The automatic navigation techniques described herein may also automatically navigate each additional nested menu or folder until an operation request is completed (e.g., to play a particular episode of a television show).

Although it is described herein that an application and content may be launched by browsing one or more screens of a GUI for the desired application and/or content, the automatic navigation may be carried out in other manners as well. For instance, as described in the following section, navigation component 228 may automatically search for the desired application and/or content, instead of browsing one or more GUI screens to identify, locate and select an object corresponding to the desired application or content.

3. Example Automatic Searching Embodiments

In embodiments, automatically navigating a media device may further include automatically searching a media device or an application executed on the media device. For example, in an embodiment, an operation command may comprise a request to search for a particular resource (e.g., an application or multimedia content) available on a media device or an application.

Based on GUI information from one or more processed frames representing a device's GUI, navigation component 228 may automatically navigate to a search function on the GUI, input a search request, obtain results, and select a resource from the results. In other embodiments, navigation component 228 may be configured to automatically navigate to a search function upon being unable to locate a desired application or content using the above automatic navigation methods. In yet another embodiment, navigation component 228 may automatically determine whether to automatically navigate a device's GUI using the above discussed methods to locate a selectable icon corresponding to an operation request or to automatically navigate to a search function within the device's GUI.

Figure 10:
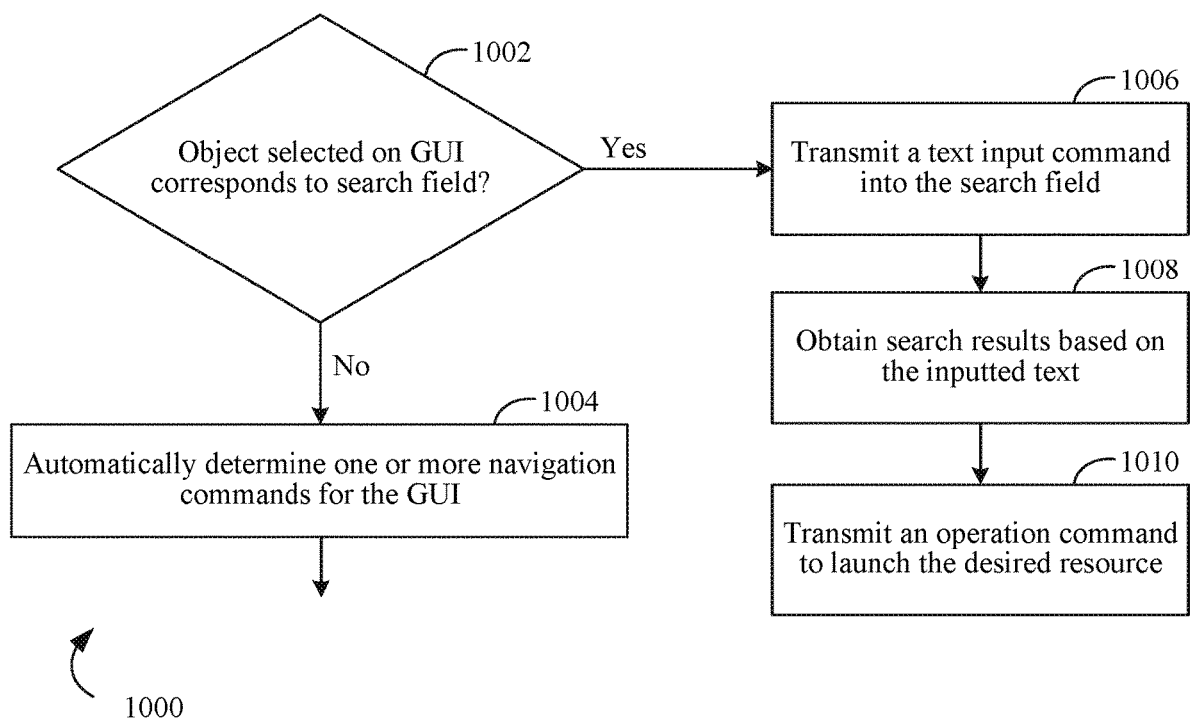
FIG. 10 is a flowchart of a method for automatically searching for a resource, according to an exemplary embodiment.

For example, FIG. 10 depicts a flowchart 1000 of a method for automatically searching for a resource through a device's GUI. The method of flowchart 1000 may be implemented by system 200 as described above in reference to FIG. 2 and navigation component 228 as described in reference to FIG. 4. Other structural and operational embodiments will be apparent to persons skilled in the relevant art(s) based on the following discussion regarding flowchart 1000, system 200, and navigation component 228.

In step 1002, a determination is made whether an object selected on the GUI corresponds to a search field. For instance, navigation determiner 410 may determine, based on GUI information extracted from one or more video frames, whether the selected object on the GUI screen is a search field. This determination may be made, for example, in a manner similar to step 310 described above with reference to FIG. 3 based on the GUI information extracted from one or more video frames. For example, extracted GUI information corresponding to a search field may include an identification of a magnifying glass or text (e.g., "search") or the like present on the GUI representative of a search function. If the object selected on the GUI does not correspond to a search field, the flow proceeds to step 1004, otherwise to step 1006.

In step 1004, if the object selected on the GUI is not a search field, one or more navigation commands are automatically determined to navigate the GUI until a search field is selected. For instance, the automatic determination of one or more navigation commands in step 1004 may be carried out in a manner similar to step 312 of FIG. 3. Once navigation determiner 410 automatically determines the one or more navigation commands, the navigation commands may be transmitted to the GUI, and the flow may proceed in a similar iterative manner described above with reference to FIG. 3 until the selected object corresponds to a search field.

As in the prior illustrative example, FIG. 11A depicts an exemplary GUI 1102 which contains a plurality of selectable objects (e.g., Applications 1-6), along with a search field. In this illustrative example, navigation determiner 410 may determine that a search field is not currently selected, and instead that a different object is currently selected (e.g., Application 1) based on GUI information extracted from the one or more video frames. In this illustrative example, navigation determiner 410 may automatically determine one or more navigation commands needed to navigate the GUI to cause the search field to be selected. In this example, navigation determiner 410 may determine that that a 'right' command should be transmitted two times, followed by an 'up' command, and command transmitter 412 may transmit such commands accordingly as described above.

Returning now to the description of flowchart 1000 of FIG. 10, in step 1006, if it is determined that the object selected on the GUI corresponds to a search field, a text input query is transmitted. For instance, once navigation determiner 410 determines that a search field is selected on the GUI, command transmitter 412 may transmit a text input query for insertion into the text field of the GUI. A text input query corresponding to the operation request may be determined, for example, by converting a voice command from a user to a text string using techniques known to those skilled in the art. In an embodiment, the text input query may be transmitted by navigating an on-screen keyboard (not shown) on a GUI consistent with the techniques described herein. In another embodiment, a text input query may be transmitted as a letter or an entire string directly to the media device via signal 234. For instance, command transmitter 412 may transmit a letter or a string of characters via an IR or RF signal (e.g., via Bluetooth®). In another embodiment, may transmit a letter or a string of characters over a network (e.g., an IP-based network) to which both switch 202 and the media device are coupled. In yet another embodiment, a letter or a string of characters may be transmitted via an HDMI-CEC signal carried over HDMI interface 208.

As an illustrative example, FIGS. 13A and 13B depict an exemplary GUI 1302 of a media device that may be automatically navigated in accordance with automatic navigation techniques described herein to carry out a search. As illustrated in FIG. 13A, upon selecting the object corresponding to the search field, a search string (e.g., "Resource") may be transmitted for application on GUI 1302.

Referring back to flowchart 1000 of FIG. 10, in step 1008, search results are obtained based on the inputted text. For instance, in an embodiment, command transmitter 412 may be configured to automatically one or more additional command following the entry of a search string to execute the search. In another embodiment, the GUI of the media device automatically executes the search in response to one or more characters or a string of characters being input into the search field. Once the GUI of the connected media device executes the search, the search results may appear on one or more additional screens of the GUI.

For example, continuing with the illustrative example in FIG. 13A, GUI 1302 depicts an example interface in which search results (e.g., "Resource A," "Resource B," "Resource C," etc.) may be obtained upon executing a search. Although the results depicted herein are shown on a single screen, search results may span across a plurality of screens of GUI 1302. For instance, additional search results may be obtained by navigating to a "next page" object or scrolling the GUI to obtain additional results. Because embodiments described herein may process video frames representing a GUI irrespective of the particular device or GUI, navigation component 228 may automatically determine how to navigate obtained search results irrespective of the particular layout on a GUI.

Returning back to the description of flowchart 1000 of FIG. 10, in step 1010, one or more commands are transmitted to launch the desired resource. For instance, with reference to FIG. 4, navigation determiner 410 may automatically determine, based on GUI information corresponding to a GUI screen containing one or more search results, which of the search results corresponds to the desired resource. In response to the determination, command transmitter 412 automatically transmits the appropriate navigation commands to navigate to the desired resource (if necessary), and transmits an operation command to launch the desired resource using a similar iterative process as described above. With reference to the illustrative GUI 1302 in FIG. 13B, navigation determiner 410 may automatically determine that the first result (e.g., "Resource A") corresponds to the desired resource. Accordingly, navigation determiner 410 and command transmitter 412 may automatically navigate GUI 1302 in a manner that causes the desired resource to be selected. Upon selecting the appropriate resource from the results, command transmitter 412 may transmit an operation command to launch resource in a manner described previously.

Although GUI 1302 illustrated in FIGS. 13A and 13B may comprise an exemplary GUI of a media device that may be automatically navigated to carry out a search, the automatic searching technique may similarly be applied to a search function within an application executed on the media device, or any other search field that may be displayed on a GUI of a media device (e.g., searching an entire media device, searching a particular application executed on the media device, searching within multimedia content, etc.).

In some example embodiments, one or more of operations 1002, 1004, 1006, 1008, and/or 1010 of flowchart 1000 may not be performed. Moreover, operations in addition to or in lieu of operations 1002, 1004, 1006, 1008, and/or 1010 may be performed. Further, in some example embodiments, one or more of operations 1002, 1004, 1006, 1008, and/or 1010 may be performed out of order, in an alternate sequence, or partially (or completely) concurrently with each other or with other operations.

4. Example State Determination Embodiments

In embodiments, navigation component 228 may be configured to further determination a state of the media device. For instance, video signal receiver 402 may receive a video signal from the media device. In a similar manner as discussed above, video frame extractor 404 may extract one or more video frames from the video signal, and frame processor 408 may process the frame(s) to obtain GUI information. In this example, GUI information may indicate a current state of the media device. For instance, based on one or more of the processing techniques described earlier, GUI information relating to a power state (e.g., the media device being powered on or off), a standby state, or a screensaver state.

Figure 14:
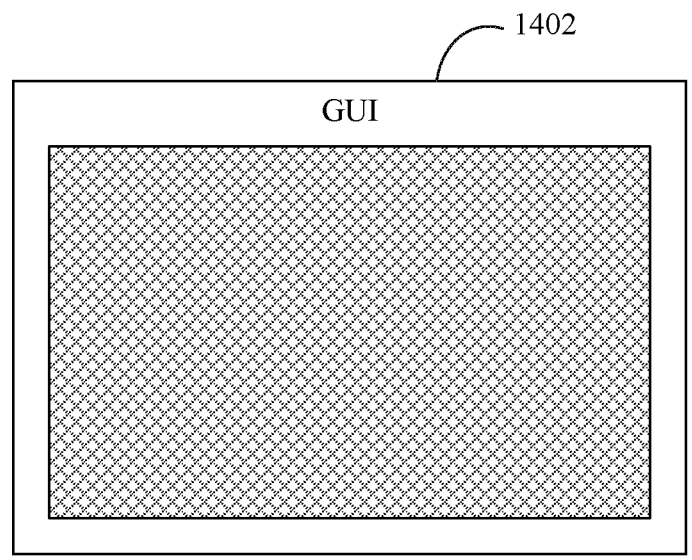
FIG. 14 is an illustrative GUI screen of a media device in a standby state, according to an exemplary embodiment.

As an illustrative example, FIG. 14 depicts an exemplary GUI 1402 which depicts an illustrative GUI screen of a media device in a standby state, according to an embodiment. In this example, navigation determiner 410 may determine that the media device is in a standby state in a variety of ways. For instance, GUI information obtained from the processed video frame(s) may indicate a lack of any selectable objects in the video frame. In another embodiment, the GUI information may indicate that the screen is blank (e.g., a black screen), even though the media device is powered on. In this example, based on the GUI information, navigation determiner 410 may determine that the media device is in a standby state, and automatically cause command transmitter 412 to issue a command to "wake" the media device from its standby state. In an embodiment, the wake command may comprise a predetermined command to wake the media device (e.g., a "power on" command). In another embodiment, media device may enter an active state from a standby state in response to any command received via command transmitter 412.

In another embodiment, video signal receiver 402 may receive a video signal comprising a logo moving across a screen or any other video signal suggesting that a media device is in a screensaver mode. Frame processor 408 may process one or more video frames to obtain GUI information that indicates that the media device is in a screensaver mode. In response, navigation determiner 410 may cause command transmitter 412 to issue a similar command to wake the media device.

In yet another embodiment, video signal receiver 402 may not receive a video signal, or may receive a video signal indicating that the media device is not presently powered on. In this scenario, based on the GUI information from the processed video frame, navigation determiner 410 may automatically determine that the media device is to be powered on. In response to this determination, command transmitter 412 may transmit a command to power on the media device.

In yet another embodiment, video signal receiver 402 may receive a video signal indicating that the GUI is powered on and awake, but is not displaying any selectable icons. For example, switch 202 may receive an operation request to launch an application on the media device while the media device is currently playing back unrelated multimedia content. In this example, the video signal received by video signal receiver 402 may not resemble a GUI screen of the media device, but rather the unrelated multimedia content. As a result, since processing the one or more video frames may not identify any selectable objects, navigation determiner 410 may automatically determine that the media device must be navigated back to a predetermined screen (e.g., a home screen) before locating and launching the desired application. Accordingly, navigation determiner 410 may cause command transmitter 412 to transmit a command to cause the media device to abort playing back the multimedia content and/or display a predetermined screen (e.g., a home screen). Once the media device is navigated to the predetermined screen (e.g., a home screen), a video signal comprising a GUI of the media device may be received and processed, enabling navigation component 228 to automatically navigate the GUI to launch the desired application.

In yet another embodiment, the techniques described herein may be used to determine if a media device is in a state of upgrading a firmware or an application. For instance, upon receiving a video signal, extracting a video frame, and processing the video frame, GUI information may be obtained indicating a firmware or application upgrade in a number of ways. In an embodiment, using the processing techniques above, GUI information may be obtained that indicates the presence of a progress bar. In another embodiment, text may be extracted from the video frame(s) indicating an upgrade. For example, extracted text may indicate that an upgrade is in progress or the like. In this illustrative example, an alternative GUI may be presented to a user providing a user with a message indicating that a firmware or application is being upgraded. In such an example, an operation request from a user may be automatically canceled or may be postponed until the upgrade is completed. In another embodiment, the alternative GUI may provide the user with an option to cancel the upgrade and continue with the automatic navigation of the GUI based on the user's operation request.

The above state determination examples are not intended to be limiting. It will be understood and appreciated that any other state of a media device may be automatically determined using the techniques described above. For instance, navigation component 228 may automatically determine that a media device is in a state of downloading additional applications or content, may be in an error state (e.g., lack of network connectivity to a network or media source) or any other error/warning state of the media device. It will be understood and appreciated that by receiving a video signal, extracting a video frame, and processing the video frame(s) to obtain information from the video frame, any other state of a media device may be automatically determined using the techniques described above.

5. Example Device Configuration Embodiments

Figure 15:
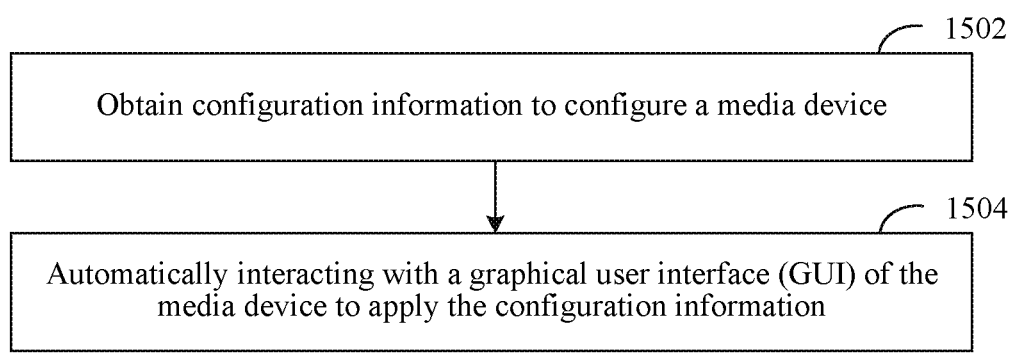
FIG. 15 is a flowchart of a method for automatically interacting with a GUI of a media device, according to an exemplary embodiment.

In embodiments, automatic navigation of a GUI of a media device may enable automatically configuring the media device. For instance, FIG. 15 depicts a flowchart 1500 of a method for automatically interacting with a GUI of a media device to configure the media device. The method of flowchart 1500 may be implemented by system 200 as described above in reference to FIG. 2 and navigation component 228 as described in reference to FIG. 4. Other structural and operational embodiments will be apparent to persons skilled in the relevant art(s) based on the following discussion regarding flowchart 800, system 200, and navigation component 228.

In step 1502, configuration information is obtained to configure a media device. In embodiments, configuration information may be obtained in a variety of ways. For instance, one of detectors 226 may obtain configuration information from a user, such as via a remote control. In another embodiment, one of detectors 226 may detect a voice command from a user comprising configuration information. In yet another embodiment, configuration information may be obtained from a remote server or any other network-based device capable of transmitting configuration information to switch 202. For example, a remote computer may transmit, via network interface 232, information used to modify any one of a number of settings of a connected media device. In accordance with embodiments discussed herein, configuration information may include any type of information that may be used to configure, modify, enable, or disable any feature, option, or setting of a connected media device. Configuration information may also include information to configure, modify, enable, or disable any feature, option, or setting of any application executable on the media device. Additional examples of configuration information are discussed below with reference to FIGS. 16-18.

Figure 16:
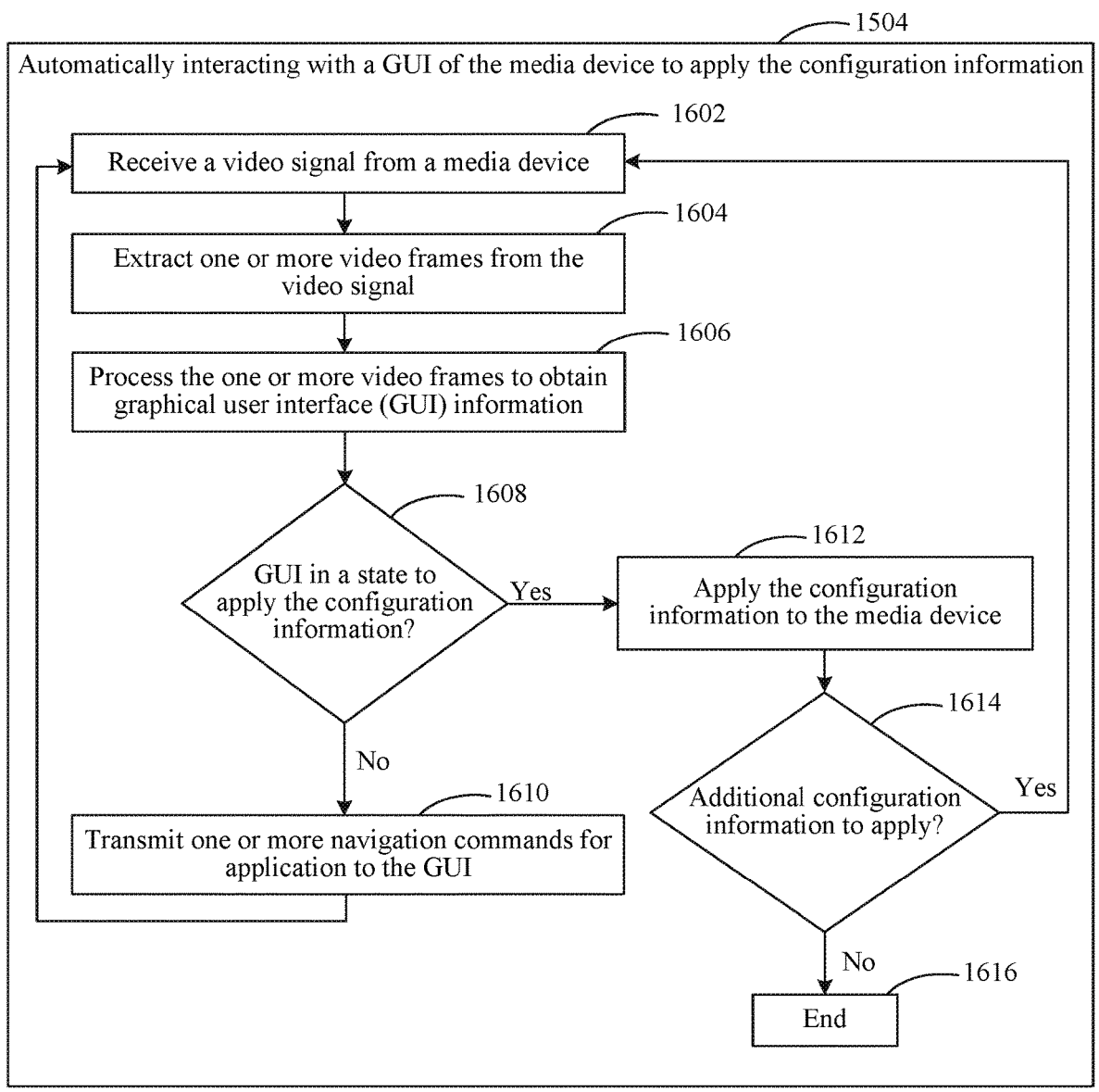
FIG. 16 is a flowchart of a method for automatically interacting with a GUI of a media device to apply configuration information, according to an exemplary embodiment.

In step 1504, the configuration information is applied to a media device by automatically interacting with the media device. For instance, with reference to FIG. 4, navigation component 228 is configured to automatically interact with the media device via interface 208 and signal 234. In embodiments, the automatic interaction of the GUI of the media device in step 1504 may be performed in a variety of ways. For example, FIG. 16 depicts a flowchart 1600 of a method for automatically interacting with a GUI of a media device to apply the configuration information to the media device. The method of flowchart 1600 may be implemented by system 200 as described above in reference to FIG. 2 and navigation component 228 as described in reference to FIG. 4. Other structural and operational embodiments will be apparent to persons skilled in the relevant art(s) based on the following discussion regarding flowchart 800, system 200, and navigation component 228.

In step 1602, a video signal is received from a media device. For instance, video signal receiver 402 may receive a video signal from the connected media device, as discussed above with reference to step 304 of FIG. 3.

In step 1604, one or more video frames are extracted from the video signal. For instance, video frame extractor 404 may extract one or more video frames from the video signal received by video signal receiver 402. In embodiments, step 1604 may be performed in a manner as described above with reference to step 306 of FIG. 3.

In step 1606, the one or more video frames are processed to obtain GUI information therefrom. For instance, as discussed above with reference to step 308 of FIG. 3, frame processor 408 is configured to process the video frames using any one or more of a number of processing algorithms to obtain GUI information.

In step 1608, a determination is made whether the GUI is in a state to apply the configuration information. For instance, navigation determiner 410 is configured to determine whether a configuration option is selected on the GUI. As an illustrative example, navigation determiner 410 may determine, based on GUI information obtained from the processed frames, whether an object corresponding to a desired configuration setting is enlarged or highlighted, in a manner similar to step 310 of FIG. 3 or step 802 of FIG. 8. If navigation determiner 410 determines that the GUI is not in a state to apply the configuration information, the flow proceeds to step 1610, otherwise to step 1612.

In step 1610, if the GUI is not in a state to apply the configuration information, one or more navigation commands are transmitted for application to the GUI. For instance, with reference to FIG. 4, command transmitter 412 transmits one or more navigation commands, determined by navigation determiner 410, for application to the GUI of the media device to navigate the GUI to a state in which the configuration information may be applied. In embodiments, step 1610 may be performed in a similar manner as described above with reference to step 314 of FIG. 3. Upon transmitting the one or more navigation commands for application to the GUI, the flow reverts to step 1602.

In step 1612, if it is determined that the GUI is in a state to apply the configuration information, the configuration information is automatically applied to the media device. For instance, command transmitter 412 transmits one or more signals 234 to apply the configuration information to the media device.

In step 1614, a determination is made whether additional configuration information is to be applied. For instance, navigation determiner 410 determines whether the GUI must be further navigated to apply additional configuration information to the media device. As an example, additional configuration information may include one or more additional steps to complete the application of a configuration action (e.g., automatically inputting a password after a username has been transmitted), or any additional configuration that may be related or unrelated to the configuration action. If additional configuration information needs to be applied, the flow reverts to step 1602, otherwise the flow ends.

In some example embodiments, one or more of operations 1602, 1604, 1606, 1608, 1610, 1612, and/or 1614 of flowchart 1600 may not be performed. Moreover, operations in addition to or in lieu of operations 1602, 1604, 1606, 1608, 1610, 1612, and/or 1614 may be performed. Further, in some example embodiments, one or more of operations 1602, 1604, 1606, 1608, 1610, 1612, and/or 1614 may be performed out of order, in an alternate sequence, or partially (or completely) concurrently with each other or with other operations.

In the above manner, the automated navigation techniques described above may be utilized to interact with a GUI of a media device to automatically configure any configurable setting of the media device with minimal or reduced user involvement. Upon receiving configuration information, e.g., from a user or from another computing device, navigation component 228 may automatically determine, based on GUI information obtained from processing video frames of the media device, how to navigate the GUI to apply the configuration information.

Additional example embodiments relating to the automatic application of configuration information are explained in the following discussion. Automatically interacting with a GUI of a media device to apply configuration information is not limited, however, to the examples below. One skilled in the art will understand and appreciate that the techniques described herein may be used to automatically interact with a GUI to configure any type of setting that may be accessed via a GUI.

6. Example Automatic Resource Downloading Embodiments

In embodiments, navigation component 228 may be configured to automatically cause one or more resources (e.g., applications or multimedia content) to be downloaded on a media device. For instance, one of detectors 226 may detect a user command (e.g., via a remote control or a voice command) requesting that a resource be downloaded on a media device. In response, navigation component 228, using the techniques described herein, may automatically navigate the media device to cause the media device to download the requested resource. For instance, in embodiments, navigation component 228 may automatically launch a resource store (e.g., an application store) and locate the requested resource by browsing the available resources in the store. In other embodiments, navigation component 228 may automatically navigate to a search field in a similar manner as described earlier and search for the requested resource. In response to locating the desired resource, either by browsing or searching, navigation component 228 may be configured to automatically transmit an operation command to cause the media device to download the resource onto the media device. In another embodiment, navigation component 228 may be further configured to navigate the media device to the downloaded resource and automatically launch the resource upon completion of the download. For example, in one embodiment, upon automatically downloading and launching an application, the navigation component 228 may further navigate the application to automatically log a user into the application, as described below. Rather than requiring a user to manually perform each of these steps with a remote control, which may be cumbersome, the entire flow may be automated as discussed herein.

The automatic navigation techniques described herein may also be used in conjunction with other example embodiments, e.g., device management and/or automatic login embodiments discussed below. For example, switch 202 may provide an alternative GUI to display to a user, via one of the sink device(s) 206 in which one or more resources may be added or configured. For instance, a user may use the alternative GUI to add an application (e.g., Netflix®). In an embodiment, a user may also select a preferred media device from the plurality of media devices to launch the particular resource. The disclosed techniques may be used to browse the one or more media devices to determine whether the resource (e.g., Netflix® in this example) is installed on each media device. If not, the user may be prompted, via the alternative GUI shown on one of sink device(s) 206, whether the user wishes to install the resource on the one or more media devices. In response, navigation component 228 may automatically navigate to a resource store to obtain and/or install the missing resources as discussed earlier.

The disclosed techniques may be further utilized to automatically launch one or more installed applications and automatically login to each one using a user's login information, as discussed in more detail below. In addition, the disclosed techniques may be used to determine, based on frame processing algorithms discussed earlier, whether any of the installed applications contain additional services that may be installed, accessed, or subscribed to (e.g., additional multimedia content, a subscription service, etc.), and prompt a user automatically install, access and/or subscribe to such services accordingly.

7 Example Device Management Embodiments

The techniques described herein are not, however, limited to causing a resource to be downloaded on a media device. Navigation component 228 may automatically navigate any aspect of a media device or an application executed on a media device to download, obtain, activate, or setup any other setting, service, resource or function.

In embodiments, navigation component 228 may automatically navigate the media device or application based on one or more of the processing methods described above. For instance, navigation determiner 410 may determine, based on GUI information obtained from the processed video frames, how to locate and navigate to a selectable object representative of a menu where configurable settings may be located or a resource store where resources may be obtained. In another embodiment, navigation determiner 410 may determine how to navigate to a selectable object resembling a gear icon, or similar icon, that may launch a settings menu.

For example, configuration information may include a modification to an HDMI-CEC setting of a media device. In certain media devices, for instance, communication between the media device and any other device (e.g., a switch) over an HDMI-CEC protocol may be enabled or disabled by default. In embodiments, operation of switch 202 and/or a media device may be optimized with an HDMI-CEC setting enabled. In this manner, switch 202 may transmit one or more commands to the media device via an HDMI-CEC signal, rather than another type of transmission signal (e.g., IR or RF). As a result, navigation component 228 may be configured to automatically navigate the settings of the media device to locate the HDMI-CEC setting, and automatically enable or disable the feature to optimize the operation of switch 202 and/or the media device.

In another embodiment, navigation component 228 may be configured to modify a power setting of a media device. For instance, operation of switch 202 and/or a media device may be optimized by enabling or disabling a power setting, a sleep setting, or a standby setting. Navigation component 228 may automatically navigate the media device to locate such setting, and automatically enable or disable the settings as desired.

In yet another embodiment, navigation component 228 may automatically navigate a device to set up other settings, such as an audio setting, a video setting, a streaming rate, a network connection, or any other setting or service. For instance, navigation component 228 may automatically navigate the media device to modify a surround sound setting, alter an audio equalizer setting, or any other audio modification on a media device. In other embodiments, navigation component 228 may be configured to automatically navigate a media device to change a video output resolution, a frame rate, a color setting, or any other video setting of the media device.

The above examples are illustrative only and are not intended to be limiting. In accordance with the techniques described above, navigation component 228 may be configured to automatically navigate to any configurable feature or setting on a media device and modify such feature or setting in response to a user request or automatically (e.g., upon connecting a device or at a certain time of day).

In another embodiment, navigation component 228 may automatically navigate a media device based on a request received from another device (e.g., a remote server coupled to switch 220 via network interface 232). For example, a remote server may determine one or more settings on a particular media device that should be modified to optimize the operation of switch 202 and the media device. In embodiments, the remote server may transmit, via network interface 232, an operation request to switch 202 to automatically navigate the media device to modify such settings. In this manner, an individual user need not manually determine how to optimize the overall operation of system 200. Navigation component 228 may automatically navigate the media device immediately upon receiving the operation request, or may delay the automatic navigation until switch 202 or the media device is no longer in use. In another embodiment, the automatic navigation to apply the configuration settings may be delayed until a certain time of day.

8. Example Automatic Login Embodiments

In some embodiments, configuration information may include login information of a user for a particular media device, application or service. For instance, in embodiments, navigation component 228 may process video frame(s) to determine whether the GUI is displaying a login screen for an application or service. In another embodiment, the GUI screen may automatically display a login screen upon powering on the media device or launching (e.g., each time or for the first time) an application or service. In another embodiment, navigation component 228 may automatically navigate the media device or resource in a manner as described above to locate and select a login option on the GUI.

Switch 202 may be configured to obtain login information from a user in many ways. In one embodiment, a user may transmit a username and/or password (or similar login information, such as an email address or an account number) to switch 202 via a remote control or via a voice command. User login information may be transmitted to switch 202 in real-time as the automatic navigation is taking place, or switch 202 may automatically obtain login information previously stored in storage(s) 222 for logging into a media device, application or service.

Figure 17A:
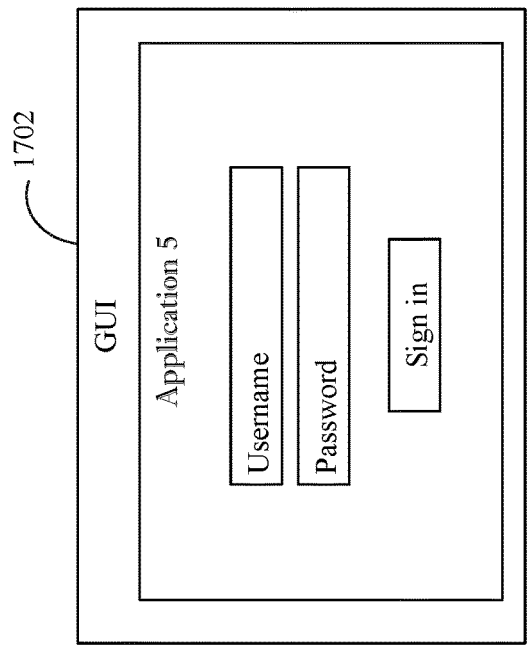
FIGS. 17A and 17B are illustrative GUI screens of a media device that may be automatically navigated to carry out a login process, according to an exemplary embodiment.
Figure 17B:
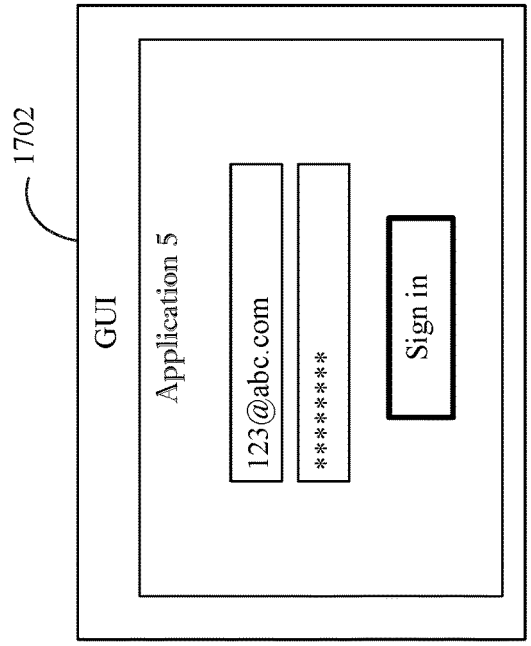

As an illustrative example, FIGS. 17A and 17B depict an exemplary GUI 1702 of a media device that may be automatically navigated to carry out a login process, according to an embodiment. Navigation determiner 410 may automatically determine that the GUI is on a login screen based on the GUI information from the processed video frame(s), as shown in FIG. 17A. In this example, navigation component 228 may automatically interact with the media device to log a user into the application. For example, as depicted in FIG. 17B, command transmitter 412 may automatically transmit one or more navigation commands to select a username field, automatically insert the username, transmit one or more additional navigation commands to select a password field, and insert the password using any of the methods described herein. In embodiments, command transmitter 412 may be further configured to transmit an operation command to submit the login information for authentication, as illustrated in FIG. 17B.

9. Example Profile Selection Embodiments

In embodiments, more than one user may utilize system 200 in accessing resources from a media device. For instance, a household in which system 200 is implemented may contain several family members, all of which use one or more resources accessible via one or more media devices coupled to switch 202. Navigation component 228 may determine which user is currently using switch 202, and automatically configure a media device (or resource accessible via a media device) based on an identity of the user. For example, a user may specify his or her identity via a remote control. In another embodiment, a user may specify his or her identity in response to a user prompt on a sink device coupled to switch 202. In yet another embodiment, switch 202 may determine, based on a voice input from a user (e.g., from a microphone in a remote control or one of detectors 226), which user among a plurality of users is currently using system 200. For example, one or more user voice profiles may be stored in a database or in storage(s) 222 of switch 202 in embodiments or in a remote storage (e.g., a cloud storage) (not shown) accessible by switch 202. In response to determining the identity of the user, navigation component 228 may automatically configure a media device to match the user's identity.

Figure 18A:
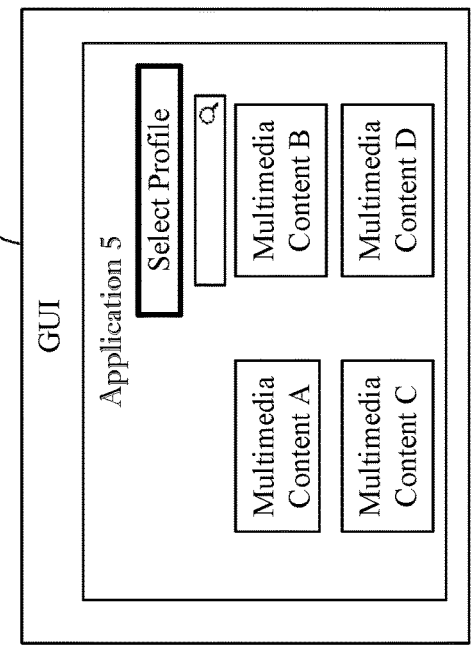
FIGS. 18A and 18B are illustrative GUI screens of a media device that may be automatically navigated to carry out a profile selection process, according to an exemplary embodiment.
Figure 18B:
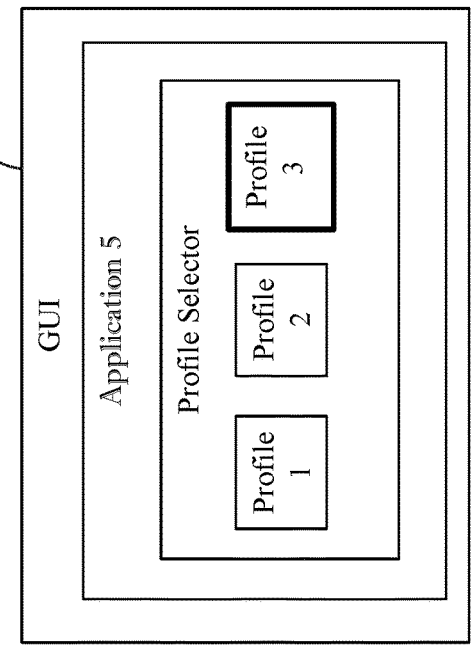

For example, FIGS. 18A and 18B depict an exemplary GUI 1802 of a media device that may be automatically navigated to carry out a profile selection process, according to an embodiment. As illustrated in FIG. 18A, navigation component 228, using the techniques described above, may automatically locate and navigate to a selectable object for launching a profile selection screen. Upon transmitting an operation command to launch the profile selection screen, GUI 1802 may provide a plurality of selectable icons corresponding to the plurality of users. Based on the GUI information obtained from processing the video frames representing GUI 1802 and the identity of the user, navigation component 228 may automatically determine which selectable icon to select. As depicted in the illustrative example of FIG. 18B, navigation component 228 may be configured to automatically cause a particular profile (e.g., "Profile 3") to be selected based on the user's identity.

Although navigation component 228 is described herein as automatically selecting a user profile in response to determining an identity of a user, it is also contemplated that navigation component 228 may perform any other automatic navigation of a GUI in response to determining a user identity. For instance, navigation component 228 may automatically login to a media device or resource, as discussed above, upon determining an identity of a user. In another embodiment, navigation component 228 may be configured to automatically modify one or more other configurable settings of a media device or resource based on a user identity. For example, a particular user may prefer certain audio and/or video settings (or other settings), while another user may prefer different settings. Accordingly, in embodiments, navigation component 228 may be configured to automatically modify one or more of such settings of a media device or resource upon determining a user identity. As a result, a user need not manually navigate the GUI to select a particular user profile upon using system 200. Rather, navigation component 228 may automate this entire flow upon with minimal or reduced user involvement.

10. Example Resource Determining Embodiments

With many media devices, a plurality of resources may be accessible via a media device. In embodiments, it may be beneficial for switch 202 to determine which resources are available on each media device. In accordance with techniques disclosed above, a first device (e.g., switch 202) may navigate a GUI of one or more other devices (e.g. media devices), for example, when the other devices may not be in use or in the background while they may be in use. Navigation component 228 may extract video frames containing one or more (e.g. all) screens that may have available resources. Using image recognition and image analysis techniques described herein, navigation component 228 may process the video frames to obtain relevant GUI information regarding the available resources. Information related to the resources may be stored as a list on the first device and mapped to the media device on which the particular resource was located via mapping component 214.

Figure 19:
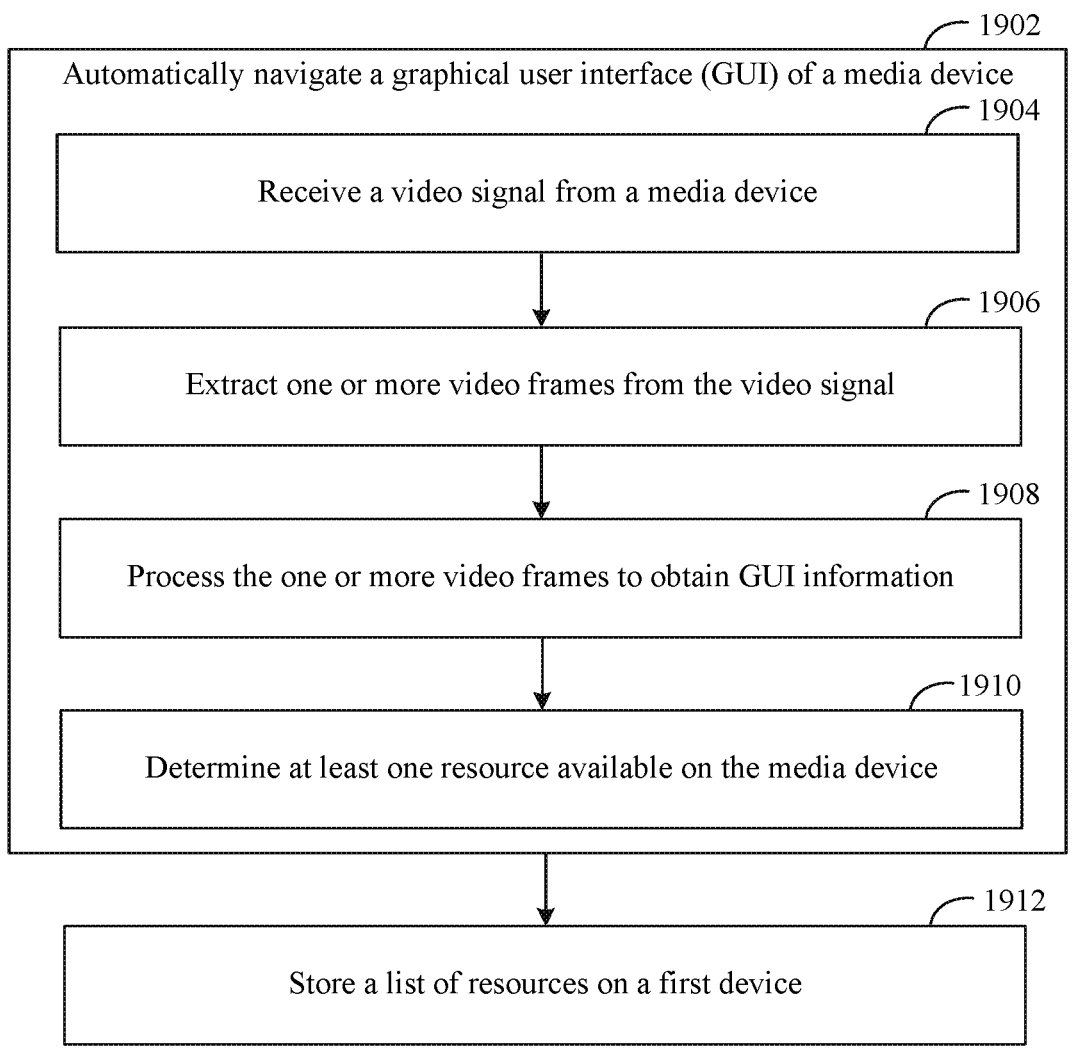
FIG. 19 is a flowchart of a method for determining and storing a list of resources available on a media device, according to an exemplary embodiment.

For instance, FIG. 19 depicts a flowchart 1900 of a method for automatically navigating a media device and storing a list of resources accessible via the media device according to an example embodiment. The method of flowchart 1900 may be implemented by system 200 as described above in reference to FIG. 2 and navigation component 228 as described in reference to FIG. 4. Other structural and operational embodiments will be apparent to persons skilled in the relevant art(s) based on the following discussion regarding flowchart 1900, system 200, and navigation component 228.

In step 1902, a GUI of a media device is automatically navigated. For instance, navigation component 228 may be configured to automatically navigate a connected media device using one or more of the techniques described herein.

In step 1904, a video signal is received from a media device. For instance, video signal receiver 402 may receive a video signal from the connected media device. In step 1906, one or more video frames are extracted from the video signal. For instance, video frame extractor 404 may extract one or more video frames from the video signal received by video signal receiver 402. In step 1908, the one or more video frames are processed to obtain GUI information therefrom. In embodiments, steps 1904, 1906, and 1908 may be performed in a manner as described above with reference to steps 304, 306, and 308 of FIG. 3.

In step 1910, at least one resource available on the media device is determined. For instance, resource determiner 414 is configured to determine, based on GUI information obtained from the one or more processed video frames, one or more resources that may be accessible via the media device. In embodiments, resources may include, but are not limited to, applications and/or multimedia content that may be accessed via the connected media device. For instance, resource determiner 414 may cause navigation determiner 410 to automatically navigate a media device to one or more GUI screens in which resources available on the media device are identified.

Figure 20B:
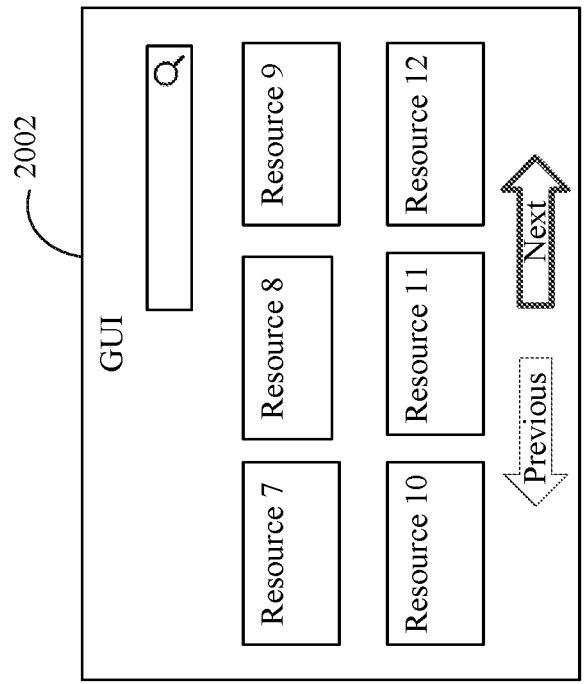
FIGS. 20A and 20B are illustrative GUI screens of a media device that may be automatically navigated to carry out a resource determination process, according to an exemplary embodiment.
Figure 20A:
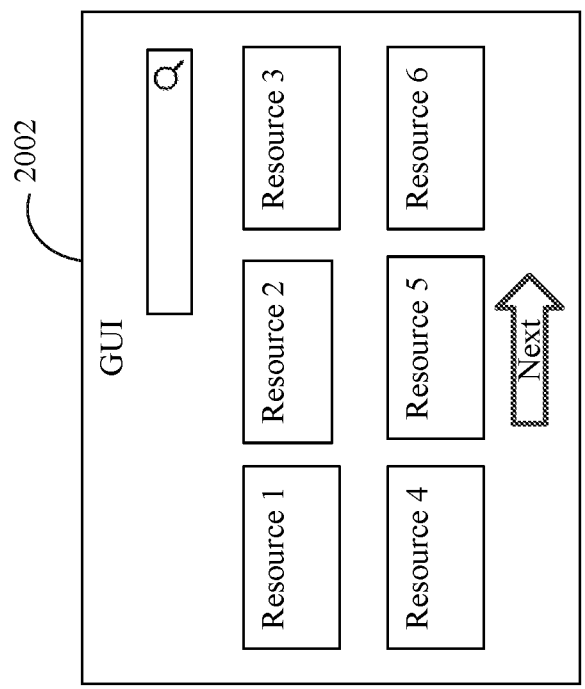

As an illustrative example, FIGS. 20A and 20B depict an exemplary GUI 2002 of a media device (or application executed on a media device) that may be automatically navigated to carry out a resource determination process, according to an embodiment. In this example, navigation determiner 410 may use the techniques described above to navigate to GUI 2002 as illustrated in FIG. 20A. Upon landing on a screen as shown in GUI 2002, GUI information may be obtained that identifies the particular resources available via the media device (or application) in which the resources are located. For instance, in this exemplary GUI screen, resource determiner 414, using the obtained GUI information, may determine that "Resources 1-6" are installed or downloaded on the media device (or application). Navigation determiner 410 may further be configured to determine if additional resources are available by scrolling the GUI screen or selecting a "next page" object, or the like. In FIG. 20A, for instance, navigation determiner 410 may automatically transmit, via command transmitter 412, a signal to navigate to the "next" page object to obtain a listing of additional resources. In response, GUI 2002 may identify additional resources, as shown in FIG. 20B. Navigation determiner 410 and resource determiner 414 may be configured to repeat this process until all of the resources accessible via the media device (or application) are identified.

Figure 21:
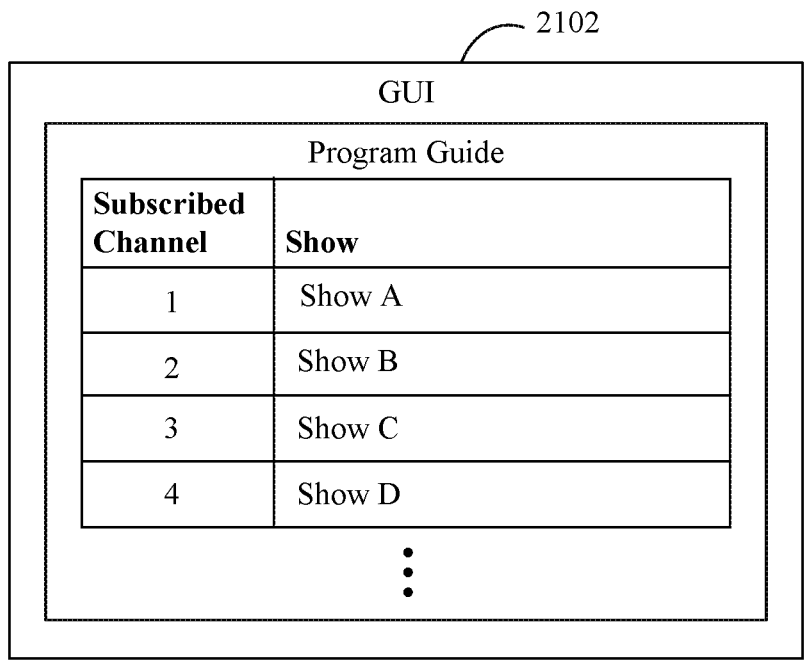
FIG. 21 is an illustrative GUI screen of a media device that may be automatically navigated to determine a subscribed channel list, according to an exemplary embodiment.

As an additional non-limiting example, FIG. 21 depicts another exemplary GUI 2102 of a media device that may be automatically navigated to determine a subscribed channel list, according to an embodiment. For instance, GUI 2102 may be a GUI of a set-top box. In an embodiment, GUI 2102 may comprise a program guide of the set-top box in which a plurality of subscribed channels and/or television shows (or movies) may be listed. In this illustrative example, navigation component 228 may utilize the above methods to automatically navigate the set-top box to launch the program guide. In another embodiment, navigation component 228 may cause a transmitter (e.g., transmitter 230) to transmit via signal 234, a command to launch the program guide (e.g., a command corresponding to a "guide" function of a remote control).

In the illustrative example of FIG. 21, upon launching the program guide, resource determiner may identify, based on GUI information obtained from one or more processed frames comprising GUI 2102, one or more subscribed channels of the set-top box. In embodiments, resource determiner may associate the one or more subscribed channels with a television show and/or television network (not shown). Similar to the illustrative example of FIGS. 20A and 20B, navigation determiner 410 may automatically transmit a signal to navigate the GUI to cause the GUI to scroll the program guide to display additional subscribed channels that may be identified by resource determiner 414. Navigation determiner 410 and resource determiner 414 may be configured to repeat this process until all of the subscribed channels are identified.

Returning now to the description of flowchart 1900 of FIG. 19, in step 1912, a list of the resources is stored on a first device. For instance, with reference to FIG. 2, navigation determiner 414 may store a list of the available resources on storage(s) 222 of switch 202. In embodiments, navigation determiner 414 may further utilize mapping component 214, which may contain a mapping of a mapping of the particular media device (and/or application) from which the resource is accessible. In this manner, if a user transmits an operation command to launch a particular resource, as discussed above, switch 202 may automatically determine, based on mapping component 214, which media device (and/or application) to select and navigate to launch the requested resource. This eliminates the need for a user to remember which resources are available on each media device (or application), thereby further enhancing the operation of switch 202.

In some example embodiments, one or more of operations 1902, 1904, 1908, 1910, and/or 1912 of flowchart 1900 may not be performed. Moreover, operations in addition to or in lieu of operations 1902, 1904, 1908, 1910, and/or 1912 may be performed. Further, in some example embodiments, one or more of operations 1902, 1904, 1908, 1910, and/or 1912 may be performed out of order, in an alternate sequence, or partially (or completely) concurrently with each other or with other operations.

11. Example DVR Browsing Embodiments

In an embodiment, a media device may be a media device configured to store recorded multimedia content, such as a DVR. Using techniques described herein, navigation component 228 may automatically navigate one or more GUI screens of the media device to obtain and store a list of recorded multimedia content. For instance, navigation component 228 may transmit the appropriate commands, in any manner as discussed above, to cause the GUI of the DVR to land on one or more screens listing each item of recorded multimedia content. Upon landing on the appropriate GUI screens, resource determiner 414 may identify and store a list of the recorded multimedia content on switch 202, in similar manner as described above.

In a further embodiment, resource determiner 414 may cause command transmitter 412 to transmit one or more appropriate navigation commands to the media device to obtain additional information (e.g., metadata) for each item of recorded multimedia content. For example, additional information (e.g., metadata) for each item of recorded multimedia content may include a television channel on which the content was recorded, an episode name/number, a date and/or time (e.g., a first air date/time and/or a recorded date/time), a description (e.g., a summary or overview of the recorded multimedia content), a cast list, and/or any other information that may be present on the GUI screen upon selecting each item of recorded multimedia content. In embodiments, resource determiner 414 may store the additional information along with the list of the recorded multimedia content, e.g., in storage(s) 222. By storing such additional information, a user may launch an item of content via an operation command that identifies the content by name, or using any of the additional information (e.g., metadata) stored along with the item of multimedia content (e.g., by requesting switch 202 to launch the most recent episode of a particular television show).

In embodiments, navigation component 228 may be configured to automatically navigate a media device while the device is not transmitting a video signal to a sink device. For instance, navigation component 228 may automatically navigate a media device during a time in which the media device or system 200 is not being used. In another embodiment, navigation component 228 may be configured to use the techniques described herein to obtain a list of the recorded multimedia content at a certain time of day (e.g., at night).

12. Example Resource Launching Embodiments

Figure 22:
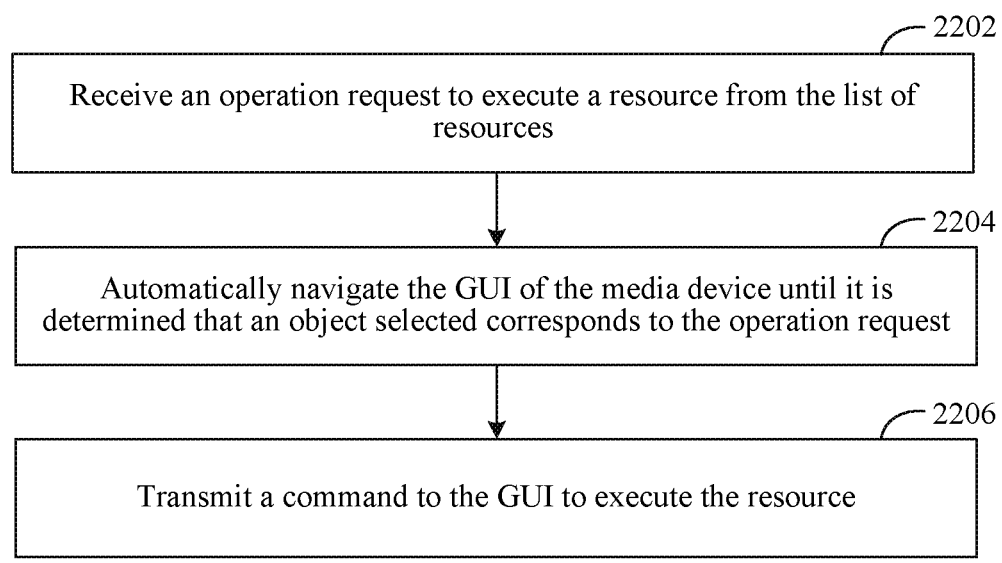
FIG. 22 is a flowchart of a method for executing a resource, according to an exemplary embodiment.

In accordance with embodiments, a user may issue a command to launch a particular resource. In some instances, a user may not recall which media device on which the particular resource is available. Using the techniques described above, switch 202 may automatically determine which media device to select to launch the desired resource. For instance, FIG. 22 depicts a flowchart 2200 of a method for automatically executing a resource from a list of resources in response to an operation command. The method of flowchart 2200 may be implemented by system 200 as described above in reference to FIG. 2 and navigation component 228 as described in reference to FIG. 4. Other structural and operational embodiments will be apparent to persons skilled in the relevant art(s) based on the following discussion regarding flowchart 2200, system 200, and navigation component 228.

In step 2202, an operation request to execute a resource from the list of resources is received. For instance, an operation request may be received in any manner as discussed previously, e.g., with respect to step 302 of FIG. 3.

In an example, an operation request may comprise a request to launch a particular resource (e.g., via a voice command).

In other embodiments, switch 202 may be configured to display a list of the one or more resources on one of sink devices 206 in an alternative GUI. In this example, an operation request may comprise a user selection of one of the listed resources. For instance, a device (e.g. a switch), having (e.g. automatically) navigated the GUIs for one or more other media devices, may provide a user with one or more alternative GUIs with items from one or more of each media device, menu, icon, logo, text, etc. For example, a user may be presented with one or more one-step (e.g. click to select) items (e.g. icons) so that a user can avoid having to navigate multi-step menus with multiple screens of another media device to select a desired resource. A single click may automatically achieve the desired result, for example, by associating a selected resource with a particular media device (or application) based on mapping component 214. Selecting a single-step icon may, for example, cause execution of the automatic navigation techniques described herein to locate and launch the desired resource. A user can avoid the time and effort otherwise necessary to find and navigate to get to items or other end-results using device GUI screens. A device (e.g. a "Smart HDMI Switch") may become a universal application launch gateway for one or more devices (e.g. third-party media devices) irrespective of each device or the layout of GUI screens on each device.

It is noted that a list of resources may be obtained in any manner, and is not limited to the technique described above. For instance, a list of resources may be obtained without automatically navigating a media device, e.g., by communicating with a media device via one or more application programming interfaces (APIs). For instance, using a suitable API, switch 202 may determine and store in storage(s) 222 a list of resources available for a particular media device.

In step 2204, a media device is automatically navigated until it is determined that an object selected on the GUI corresponds to the operation request. For instance, a connected media device may be automatically navigated in accordance with the methods described above (e.g., with respect to FIG. 3) to identify, locate, and select the object that corresponds to the operation request.

In embodiments, the user need not specify which media device to automatically navigate. For instance, switch 202 may determine, based on mapping component 214, which particular media device contains the desired resource. In response to this determination, navigation component 228 may automatically navigate the particular media device, based on the mapping, to locate the desired resource. In embodiments, switch 202 may be further configured to automatically couple the input port corresponding to the particular media device with one of the sink devices 206 before, during, or after navigation component 228 navigates the media device.

In step 2206, a command is transmitted for application to the GUI to execute the desired resource. For instance, step 2206 may be performed in a manner as described above with reference to steps 316 of FIG. 3.

In some example embodiments, one or more of operations 2202, 2204, and/or 2206 of flowchart 2200 may not be performed. Moreover, operations in addition to or in lieu of operations 2202, 2204, and/or 2206 may be performed. Further, in some example embodiments, one or more of operations 2202, 2204, and/or 2206 may be performed out of order, in an alternate sequence, or partially (or completely) concurrently with each other or with other operations.

IV. Example Integration Embodiments

As an extension, any or all the above-described embodiments and techniques can be integrated into a sink device (e.g., an HDMI sink device, such as a TV, high-definition TV (HDTV), projector, and/or the like) thereby eliminating the HDMI switch or HDMI repeater (e.g., an AVR) as an additional device between media devices and sink devices.

V. Further Example Embodiments and Advantages

One or more embodiments described herein may perform their functions according to the flowcharts described herein. Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

The automatic navigation of consumer electronic devices embodiments and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

Figure 23:
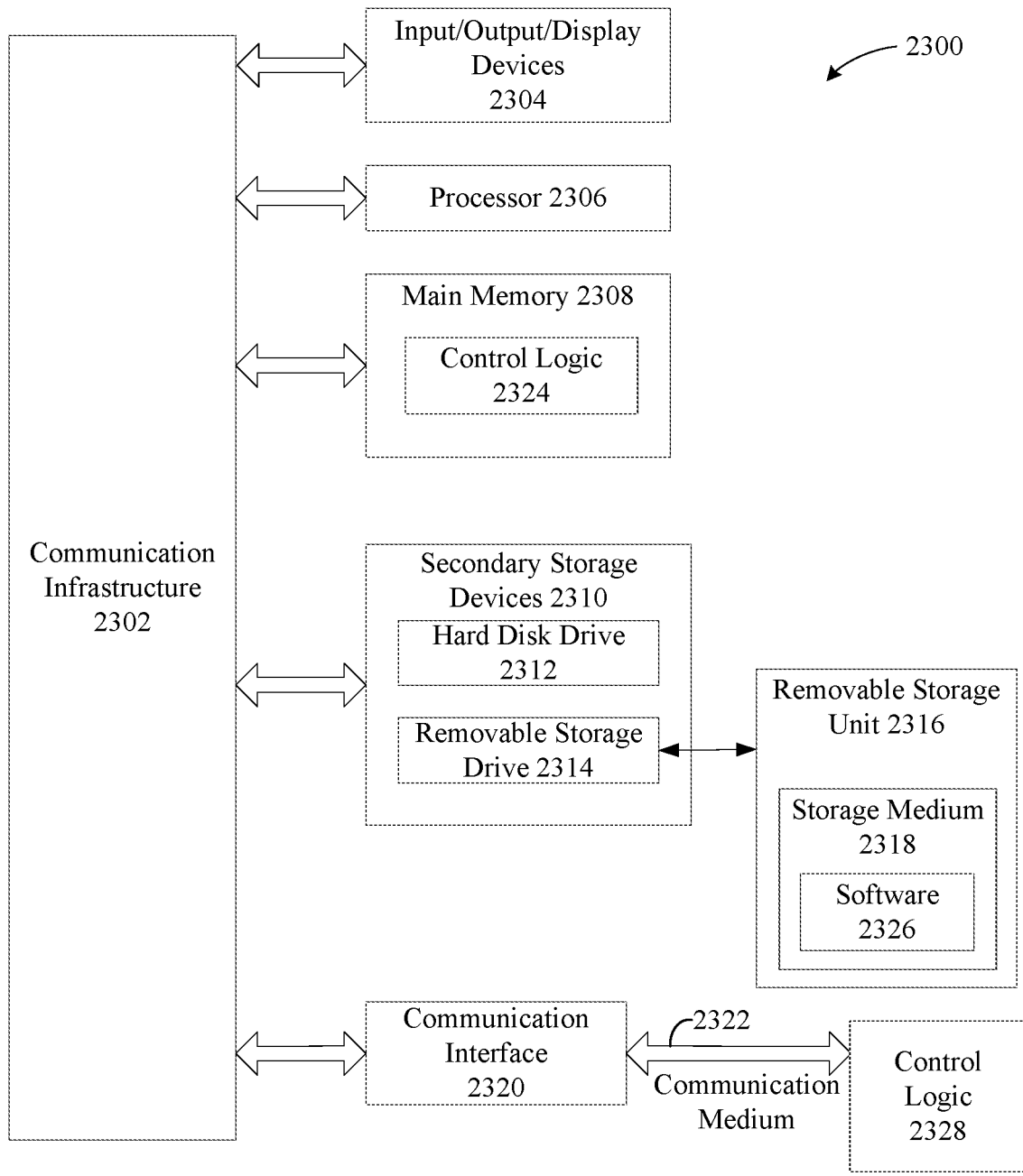
FIG. 23 is a block diagram of a computer system, according to an exemplary embodiment.

The embodiments described herein, including systems, methods/processes, devices, and/or apparatuses, may be implemented using well known processing devices, telephones (smart phones and/or mobile phones), tablet computers, servers, and/or, computers, such as a computer 2300 shown in FIG. 23. It should be noted that computer 2300 may represent communication devices, processing devices, servers, and/or traditional computers in one or more embodiments. For example, the automatic navigation of consumer electronic devices embodiments, and any of the sub-systems or components respectively contained therein, may be implemented using one or more computers 2300 or portions thereof.

Computer 2300 can be any commercially available and well-known communication device, processing device, and/or computer capable of performing the functions described herein, such as devices/computers available from International Business Machines®, Apple®, Sun®, HP®, Dell®, Cray®, Samsung®, Nokia®, etc. Computer 2300 may be any type of computer, including a desktop computer, a server, etc.

Computer 2300 includes one or more processors (also called central processing units, or CPUs), such as a processor 2306. Processor 2306 is connected to a communication infrastructure 2302, such as a communication bus. In some embodiments, processor 2306 can simultaneously operate multiple computing threads.

Computer 2300 also includes a primary or main memory 2308, such as random access memory (RAM). Main memory 2308 has stored therein control logic 2324 (computer software), and data.

Computer 2300 also includes one or more secondary storage devices 2310. Secondary storage devices 2310 include, for example, a hard disk drive 2312 and/or a removable storage device or drive 2314, as well as other types of storage devices, such as memory cards and memory sticks. For instance, computer 2300 may include an industry standard interface, such a universal serial bus (USB) interface for interfacing with devices such as a memory stick. Removable storage drive 2314 represents a floppy disk drive, a magnetic tape drive, a compact disk drive, an optical storage device, tape backup, etc.

Removable storage drive 2314 interacts with a removable storage unit 2316. Removable storage unit 2316 includes a computer useable or readable storage medium 2318 having stored therein computer software 2326 (control logic) and/or data. Removable storage unit 2316 represents a floppy disk, magnetic tape, compact disk, DVD, optical storage disk, or any other computer data storage device. Removable storage drive 2314 reads from and/or writes to removable storage unit 2316 in a well-known manner.

Computer 2300 also includes input/output/display devices 2304, such as touchscreens, LED and LCD displays, monitors, keyboards, pointing devices, etc.

Computer 2300 further includes a communication or network interface 2318. Communication interface 2320 enables computer 2300 to communicate with remote devices. For example, communication interface 2320 allows computer 2300 to communicate over communication networks or mediums 2322 (representing a form of a computer useable or readable medium), such as LANs, WANs, the Internet, etc. Network interface 2320 may interface with remote sites or networks via wired or wireless connections.

Control logic 2328 may be transmitted to and from computer 2300 via the communication medium 2322.

Any apparatus or manufacture comprising a computer useable or readable medium having control logic (software) stored therein is referred to herein as a computer program product or program storage device. This includes, but is not limited to, computer 2300, main memory 2308, secondary storage devices 2310, and removable storage unit 2316. Such computer program products, having control logic stored therein that, when executed by one or more data processing devices, cause such data processing devices to operate as described herein, represent embodiments of the invention.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, IR, and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 23) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 2306 of FIG. 23), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system for automatically navigating a graphical user interface (GUI) of a media device, the system comprising:

a first device configured to receive, via a voice command, an operation request comprising a request to perform an action executable by the media device;
one or more processing components; and
one or more memory devices that store program code configured to be executed by the one or more processing components, the program code comprising:
   a video signal receiver configured to receive a video signal from the media device in response to receiving the operation request;
   a video frame extractor configured to extract an image from the video signal, the image comprising a representation of the GUI;
   a frame processor configured to process the image to obtain GUI information therefrom, the GUI information comprising extracted text corresponding to each of a plurality of selectable objects present in the image, and a selection of a first selectable object from among the plurality of selectable objects;
   a navigation determiner configured to automatically determine one or more navigation commands for the GUI based on the received operation request and the GUI information, the one or more navigation commands being configured to cause a change in a state of the GUI when applied thereto from the selection of the first selectable object to a selection of a second selectable object corresponding to the received operation request; and
   a command transmitter configured to transmit the one or more navigation commands for application to the GUI.

2. The system of claim 1, wherein the command transmitter is further configured to:
   transmitting a command for application to the GUI to execute the second selectable object.

3. The system of claim 1, wherein the navigation determiner is configured to automatically determine the one or more navigation commands in response to a determination that the GUI is not in a state to carry out the request based at least on the received operation request, the extracted text, and the selection of the first selectable object.

4. The system of claim 1, wherein the request comprises a request to launch multimedia content on the media device.

5. The system of claim 1, wherein the voice command is captured via a microphone of a remote control.

6. The system of claim 1, wherein the frame processor is configured to process the image to obtain GUI information therefrom by:
   performing optical character recognition (OCR) on a plurality of portions of the image to capture text associated therewith, and
   mapping the captured text to each of the plurality of selectable objects.

7. The system of claim 1, wherein the navigation determiner is further configured to automatically navigate to a search field of the GUI;
   wherein the command transmitter is further configured to transmit a text query for insertion into the text field of the GUI, the text query being determined from the voice command; and
   wherein the image comprising the representation of the GUI comprises an image of a GUI screen that includes search results based at least on the transmitted text query.

8. A method of automatically navigating a graphical user interface (GUI) of a media device, the method comprising:
   receiving, via a voice command, an operation request comprising a request to perform an action executable by the media device;
   receiving a video signal from the media device;
   extracting an image from the video signal, the image comprising a representation of the GUI;
   processing the image to obtain GUI information therefrom, the GUI information comprising extracted text corresponding to each of a plurality of selectable objects present in the image, and a selection of a first selectable object from among the plurality of selectable objects;
   automatically determining one or more navigation commands for the GUI based on the received operation request and the GUI information, the one or more navigation commands being configured to cause a change in a state of the GUI when applied thereto from the selection of the first selectable object to a selection of a second selectable object corresponding to the received operation request; and
   transmitting the one or more navigation commands for application to the GUI.

9. The method of claim 8, further comprising:
   transmitting a command for application to the GUI to execute the second selectable object.

10. The method of claim 8, wherein the automatically determining the one or more navigation commands is performed in response to a determination that the GUI is not in a state to carry out the request based at least on the received operation request, the extracted text, and the selection of the first selectable object.

11. The method of claim 8, wherein the request comprises a request to launch multimedia content on the media device.

12. The method of claim 8, wherein the voice command is captured via a microphone of a remote control.

13. The method of claim 8, wherein the processing the image to obtain GUI information therefrom comprises:
   performing optical character recognition (OCR) on a plurality of portions of the image to capture text associated therewith, and
   mapping the captured text to each of the plurality of selectable objects.

14. The method of claim 8, further comprising:
   converting the voice command to a text query;
   automatically navigating to a search field of the GUI;
   transmit the text query for insertion into the text field of the GUI; and
   obtaining search results based at least on the transmitted text query, wherein the image comprising the representation of the GUI comprises an image of a GUI screen that includes the search results.

15. A computer-readable storage medium having program logic recorded thereon that, when executed by at least one processor circuit of a multimedia receiver, perform a method, the method comprising:
   receiving, via a voice command, an operation request comprising a request to perform an action executable by the media device;
   receiving a video signal from the media device;
   extracting an image from the video signal, the image comprising a representation of the GUI;
   processing the image to obtain GUI information therefrom, the GUI information comprising extracted text corresponding to each of a plurality of selectable objects present in the image, and a selection of a first selectable object from among the plurality of selectable objects;

automatically determining one or more navigation commands for the GUI based on the received operation request and the GUI information, the one or more navigation commands being configured to cause a change in a state of the GUI when applied thereto from the selection of the first selectable object to a selection of a second selectable object corresponding to the received operation request; and transmitting the one or more navigation commands for application to the GUI.

16. The computer-readable storage medium of claim 15, wherein the automatically determining the one or more navigation commands is performed in response to a determination that the GUI is not in a state to carry out the request based at least on the received operation request, the extracted text, and the selection of the first selectable object.

17. The computer-readable storage medium of claim 15, wherein the request comprises a request to launch multimedia content on the media device.

18. The computer-readable storage medium of claim 15, wherein the voice command is captured via a microphone of a remote control.

19. The computer-readable storage medium of claim 15, wherein the processing the image to obtain GUI information therefrom comprises:

performing optical character recognition (OCR) on a plurality of portions of the image to capture text associated therewith, and mapping the captured text to each of the plurality of selectable objects.

20. The computer-readable storage medium of claim 15, wherein the method further comprises:

converting the voice command to a text query;

automatically navigating to a search field of the GUI;

transmit the text query for insertion into the text field of the GUI; and obtaining search results based at least on the transmitted text query, wherein the image comprising the representation of the GUI comprises an image of a GUI screen that includes the search results.

* * * * *